(12) United States Patent
Furuuchi et al.

(10) Patent No.: US 10,964,495 B2
(45) Date of Patent: Mar. 30, 2021

(54) SWITCH DEVICE, ELECTRONIC COMPONENT, AND BATTERY SYSTEM

(71) Applicant: DEXERIALS CORPORATION, Tokyo (JP)

(72) Inventors: Yuji Furuuchi, Tochigi (JP); Yoshihiro Yoneda, Tochigi (JP); Koichi Mukai, Tochigi (JP); Kazuyuki Sakakibara, Aichi (JP)

(73) Assignee: DEXERIALS CORPORATION, Tokyo (JP)

( * ) Notice: Subject to any disclaimer, the term of this patent is extended or adjusted under 35 U.S.C. 154(b) by 285 days.

(21) Appl. No.: 15/766,951

(22) PCT Filed: Oct. 5, 2016

(86) PCT No.: PCT/JP2016/079595
§ 371 (c)(1),
(2) Date: Apr. 9, 2018

(87) PCT Pub. No.: WO2017/061454
PCT Pub. Date: Apr. 13, 2017

(65) Prior Publication Data
US 2018/0301302 A1    Oct. 18, 2018

(30) Foreign Application Priority Data
Oct. 7, 2015   (JP) .............................. JP2015-199813

(51) Int. Cl.
*H01H 29/06* (2006.01)
*H01H 35/18* (2006.01)
*H01H 35/42* (2006.01)
*H01M 10/04* (2006.01)
*H01M 2/34* (2006.01)
(Continued)

(52) U.S. Cl.
CPC .............. *H01H 29/06* (2013.01); *G01M 3/16* (2013.01); *H01H 35/18* (2013.01); *H01M 2/34* (2013.01); *H01M 10/04* (2013.01); *H01H 35/42* (2013.01); *H01H 85/0039* (2013.01)

(58) Field of Classification Search
CPC combination set(s) only.
See application file for complete search history.

(56) References Cited

FOREIGN PATENT DOCUMENTS

CN   106463315 A   2/2017
JP   S55-93037 A   7/1980
(Continued)

OTHER PUBLICATIONS

WO2015/186687 English translation. Yoneda et al. Wipo. Dec. 10, 2015 (Year: 2015).*

(Continued)

*Primary Examiner* — Christopher P Domone
(74) *Attorney, Agent, or Firm* — Oliff PLC

(57) ABSTRACT

A switch device capable of safely opening an electrical circuit in response to an abnormality such as wetting with water or liquid leaking from a battery. The device includes a first conductor connected to an external circuit and having a relatively high ionization tendency, and a second conductor arranged close to the first conductor and having a relatively low ionization tendency which is lower than that of the first conductor, a reaction part which electrically corrodes the first conductor is formed by a liquid between the first and second conductors.

33 Claims, 19 Drawing Sheets

(51) Int. Cl.
*G01M 3/16* (2006.01)
*H01H 85/00* (2006.01)

(56) References Cited

FOREIGN PATENT DOCUMENTS

| | | |
|---|---|---|
| JP | H11-144695 A | 5/1999 |
| JP | 2000-162081 A | 6/2000 |
| JP | 2009-037935 A | 2/2009 |
| JP | 2009-150806 A | 7/2009 |
| JP | 2015-228354 A | 12/2015 |
| WO | WO2015186687 | * 12/2015 |

OTHER PUBLICATIONS

Nov. 29, 2016 Search Report issued in International Patent Application No. PCT/JP2016/079595.
Feb. 2, 2019 Office Action issued in Chinese Patent Application No. 201680055810.4.

* cited by examiner

SWITCH DEVICE, ELECTRONIC COMPONENT, AND BATTERY SYSTEM

TECHNICAL FIELD

The present disclosure relates to a switch device for opening an electrical circuit in response to entrance of a liquid as well as an electronic component and battery system incorporating the same. This application claims priority to Japanese Patent Application No. 2015-199813 filed on Oct. 7, 2015, the entire contents of which are hereby incorporated by reference.

BACKGROUND ART

In recent years, lithium ion secondary batteries have been incorporated in a large number of mobile phones and laptops, among other electronic appliances. Lithium ion secondary batteries have high energy densities and, to ensure the safety of users and electric appliances, are typically provided with several protective circuits incorporated in the battery pack for over-charging protection and over-discharging protection to interrupt the input and output of the battery pack under predetermined conditions. However, if a positive/negative electrode insulation fitting portion were to be corroded by being wet, there is a possibility that pressure from the interior of the battery might leak and a safety valve might malfunction to cause a fire.

CITATION LIST

Patent Literature

PLT 1: Japanese Unexamined Patent Application Publication No. H11-144695
PLT 2: Japanese Unexamined Patent Application Publication No. 2000-162081

SUMMARY OF INVENTION

Technical Problem

Some batteries have employed seals applied for detecting evidence of and providing a warning for exposure to water (for example, see PLT 1); however, battery use is not restricted, potentially creating a risk of a circuit malfunction caused, for example, by migration (degraded insulation) or short circuits due to a wet circuit substrate. Furthermore, a malfunction equivalent to that described above might occur in the case of leaking electrolyte solution accompanying a battery abnormality.

As a measure for wetting of electronic appliances with water, sensors for detecting liquids such as water have been provided which activate a protective circuit by transmitting a signal from the sensor when detecting water. For example, a water leak sensor having a detector constituted by a pair of electrodes disposed on an insulating substrate to face each other across a predetermined interval has been proposed (for example, see PLT 2). In this water leak sensor, when there is water between the electrodes of the detector, electricity leaking between terminals causes a signal to be input to a control circuit to control operation of the device. Because liquid has to enter into the detector to trigger operation, this water wetting sensor requires a configuration to actively draw water into the detector in a wet state; however, in states other than the wet state, in which activating the control circuit is unnecessary, the sensor must avoid improper activation so as to ensure reliability as a sensor.

In view of such conventional circumstances, an object of the present disclosure is to provide a switch device capable of safely opening an electrical circuit in response to an abnormality, such as wetting with water or liquid leaking from a battery, and an electronic component and battery system incorporating the same.

Solution to Problem

In order to solve the above problem, a switch device according to the present disclosure includes a first conductor connected to an external circuit and having a relatively high ionization tendency, and a second conductors arranged close to the first conductor and having a relatively low ionization tendency which is lower than that of the first conductor, a reaction part which electrically corrodes the first conductor being formed by a liquid between the first and second conductors.

Furthermore, an electronic component according to the present disclosure includes an external-connection terminal connected to an external circuit, and a conductor arranged close to the external-connection terminal and having a relatively low ionization tendency which is lower than that of the external-connection terminal, a reaction part which electrically corrodes the external-connection terminal being formed by a liquid retained between the external-connection terminal and the conductor.

Furthermore, a battery system according to the present disclosure includes a battery, and a conductor arranged close to a terminal of the battery and having a relatively low ionization tendency which is lower than that of the terminal, a reaction part being formed which electrically corrodes the terminal with a liquid retained between the terminal and the conductor.

Advantageous Effects of Invention

According to the present disclosure, when liquid enters between the first and second conductors, electrical resistance in the first conductor increases due to electrical corrosive action, which decreases a current rating, it is thereby possible to safely open an electrical circuit.

DESCRIPTION OF EMBODIMENTS

Figure 1:
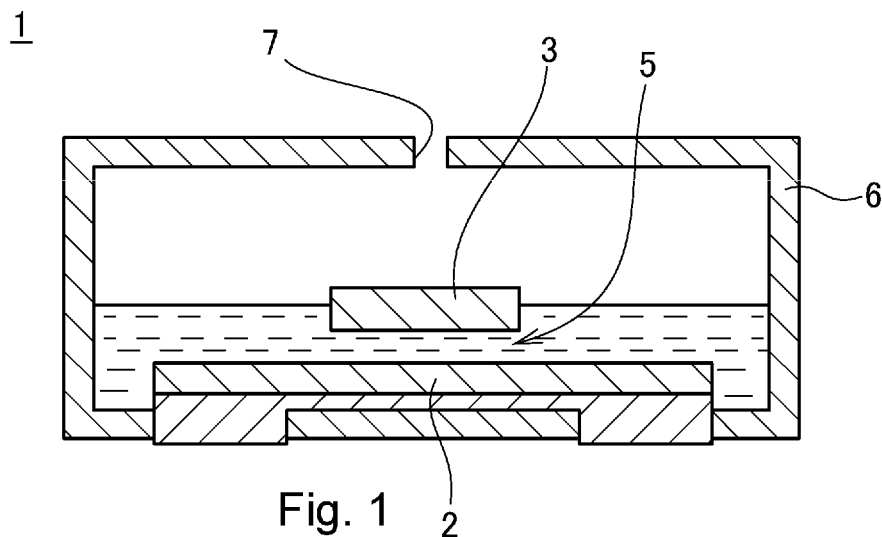
FIG. 1 is a cross-sectional view illustrating one example of a switch device according to the present disclosure.

Embodiments of a switch device according to the present disclosure as well as an electronic component and battery system incorporating the same will now be more particularly described with reference to the accompanying drawings. It should be noted that the present disclosure is not limited to the embodiments described below and it is a matter of course that various modifications can be added to the embodiments without departing from the scope of the present disclosure. Furthermore, the features illustrated in the drawings are illustrated schematically and are not intended to be drawn to scale. Actual dimensions should be determined in consideration of the following description. Moreover, those skilled in the art will appreciate that dimensional relations and proportions may be different among the drawings in some parts.

A switch device according to the present disclosure is incorporated into an external circuit such as a battery circuit and interrupts the external circuit in the case of a wet state such as submersion in water or liquid leaking. Referring to FIG. 1, a switch device 1 includes a first conductor 2 connected to an external circuit and having a relatively high ionization tendency, and a second conductor 3 arranged close to the first conductor 2 and having a relatively lower ionization tendency than the first conductor 2; between the first and second conductors 2, 3, a liquid entering the device interior collects to form a reaction part 5 which electrically corrodes the first conductor 2. Moreover, the switch device 1 may include a housing 6 in which the first and second conductors 2, 3 and the reaction part 5 are arranged, and a guiding inlet 7 may be formed in the housing 6 for guiding the liquid to the reaction part 5.

Conductors

The first conductor 2 serves as a connecting terminal for connecting to a terminal portion provided in the external circuit in which the switch device 1 is incorporated, and is, for example, formed in a substantially rectangular-plate shape; as the first conductor 2, it is possible to use a fuse element mounted between a pair of electrode terminals on an insulating substrate incorporated in the housing 6 of the switch device 1. Moreover, the first conductor 2 may be, for example, an electrode pattern formed on an insulating substrate incorporated in the housing 6 of the switch device 1, or a metal plate or lead wire, among others, may be used.

In the switch device 1, connecting ends of the first conductor 2 are led to the exterior of the housing 6 via a pair of electrode terminals to allow connection with a terminal portion of the external circuit. Furthermore, the switch device 1 allows current to flow through the first conductor 2 under normal conditions, and when the reaction part 5 comes into contact with a liquid, the reaction part 5 acts to cause blowout of the first conductor 2, thereby opening the external circuit.

The second conductor 3 is, for example, formed in a rectangular-plate shape as in the first conductor 2, and is arranged to oppose and be close to the first conductor 2. By arranging the first and second conductors 2, 3 close to each other, liquid entering the device interior collects to form the reaction part 5 which electrically corrodes the first conductor 2.

Furthermore, the second conductor 3 uses a material having a relatively lower ionization tendency than that of the first conductor 2. Thereby, when water enters between the first conductor 2 and the second conductor 3, the first conductor 2, being made of a base metal, becomes a positive electrode and is ionized (corroded); the first conductor 2 becomes narrower and/or pinholes are generated, thereby increasing electrical resistance of the first conductor 2, by which a rated current can be lowered.

Reaction Part

The reaction part 5 irreversibly interrupts the first conductor 2 by coming into contact with a liquid entering the housing 6 and has a variety of configurations depending on the form of the first and second conductors 2, 3.

Figure 2:
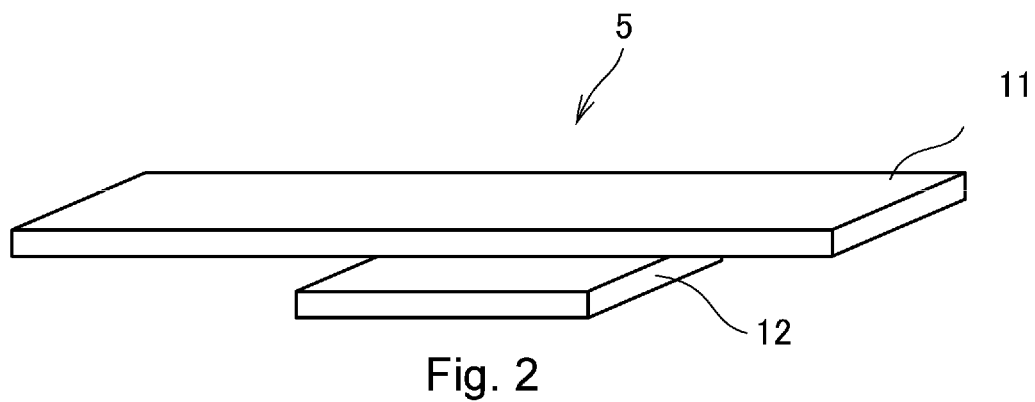
FIG. 2 is a perspective view schematically illustrating a fuse element before electrical corrosion.

Referring now to FIG. 2, a case will be explained in which a fuse element 11 serving as one example of the first conductor 2 formed in a flat-plate shape which electrically connects an external circuit under normal conditions and opens the external circuit when a wet state occurs, a central portion of one surface of the fuse element 11 faces an electrode 12 serving as one example of the second conductor 3, and the electrode 12 has an ionization tendency which is lower than that of the fuse element 11.

By arranging the fuse element 11 and the electrode 12 close to each other, a reaction part 5 is formed which electrically corrodes the fuse element 11 when a liquid exists therebetween. In this reaction part 5, when an abnormality occurs, such as wetting with water or liquid leaking from a battery, liquid collects between the fuse element 11 and the electrode 12, and the fuse element 11 is electrically corroded. This increases electrical resistance and decreases the rated current so that current flowing through the fuse element 11 causes the fuse element 11 to self-interrupt, by which an electrical circuit can be safely opened.

The fuse element 11 and electrode 12 are situated close to each such that water can enter, the distance therebetween is preferably 0.01 to 10 mm. Moreover, because reducing distance between the fuse element 11 and the electrode 12 increases electric field intensity and corrosive action as well as capillary action which promotes guidance of water between the fuse element 11 and the electrode 12, the distance between the fuse element 11 and the electrode 12 is more preferably 0.01 to 1 mm to more efficiently open the electrical circuit.

The fuse element 11 has a predetermined rated current and blows out when a current exceeding the rating flows therethrough. The fuse element 11 preferably contains, as a primary constituent, any one of aluminum, iron, nickel, tin, and lead. It should be noted that, herein, primary constituent means a component constituting 50 wt % or more of a total mass of a material.

The electrode 12 is arranged to face the central portion of one surface of the fuse element 11. It should be noted that the electrode 12 may be arranged so as to face central portions of both surfaces of the fuse element 11 to increase the amount by which the fuse element 11 is corroded.

Moreover, the electrode 12 is made of a metal having a lower ionization tendency than that of the fuse element and preferably contains, as a primary constituent, any one of gold, platinum, silver, copper, and palladium. Thereby, when water enters between the fuse element 11 and the electrode 12, the fuse element 11, which is made of a base metal, becomes a positive electrode and is ionized (corroded); the fuse element 11 becomes narrower and/or pinholes are generated and electrical resistance of the fuse element 11 increases, by which the rated current can be decreased.

Figure 3:
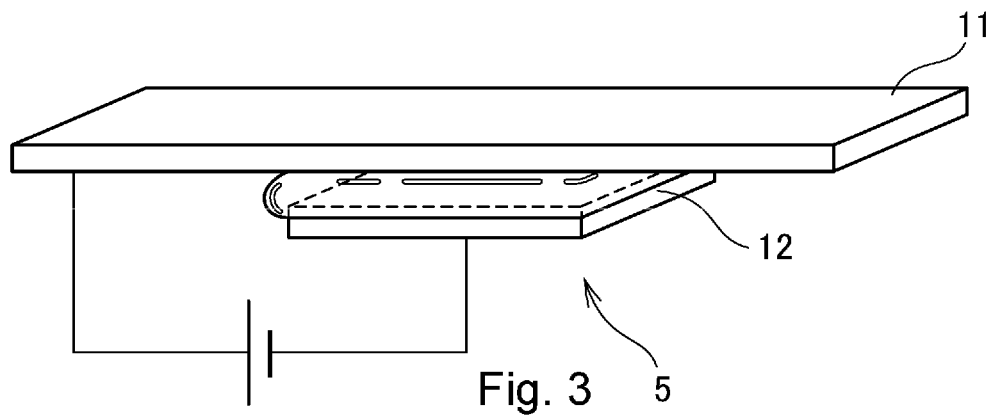
FIG. 3 is a perspective view illustrating a fuse element connected as a positive electrode and an electrode connected as a negative electrode.
Figure 4:
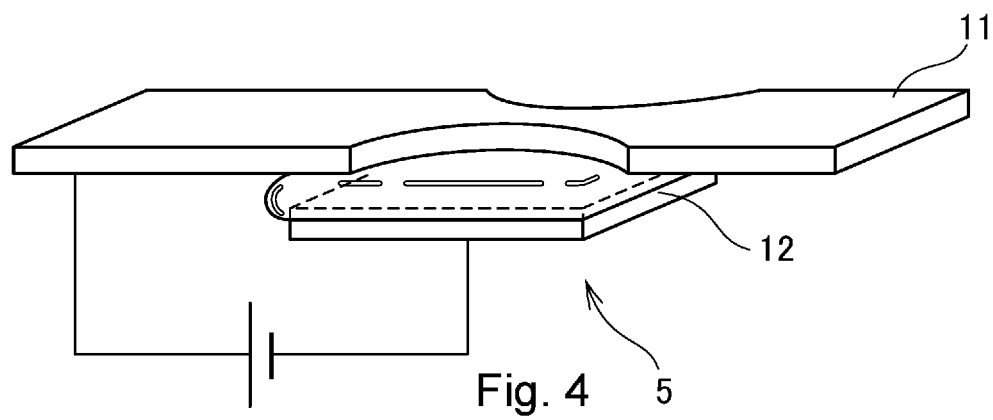
FIG. 4 is a perspective view schematically illustrating a fuse element after electrical corrosion.

As illustrated in FIGS. 3 and 4, it is preferable to connect the fuse element 11 as a positive electrode and to connect the electrode 12 as a negative electrode. This promotes the electrically corrosive reaction and can quickly reduce the rated current of the fuse element 11.

Figure 5:
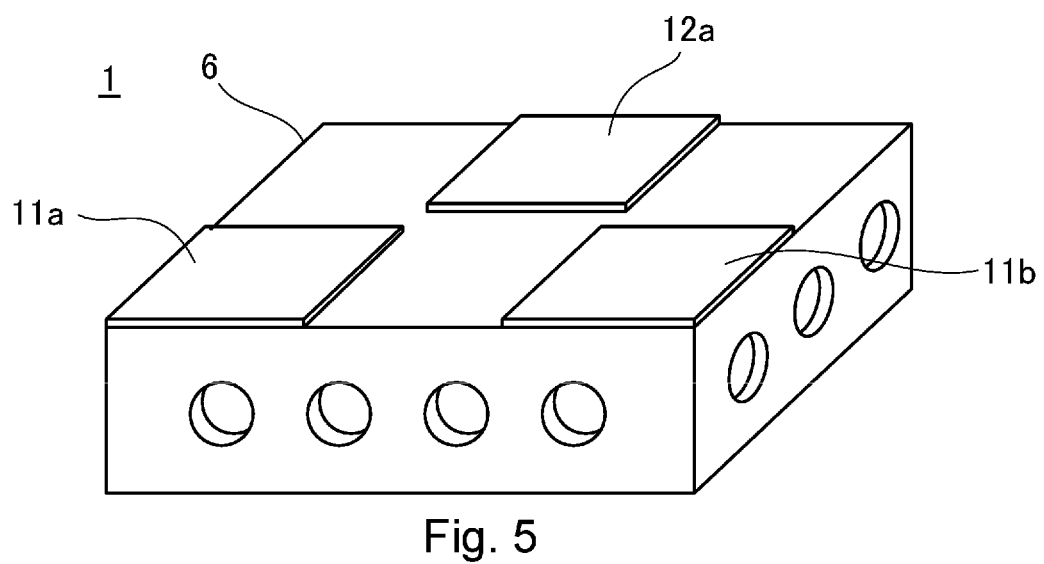
FIG. 5 is a perspective view illustrating a switch device including first and second terminals connecting a fuse element and a third terminal connecting an electrode as a negative electrode.

Thus, the switch device 1 constitutes an interrupting circuit including the fuse element 11 connected in series as a positive electrode to a direct-current power source and the electrode 12 connected as a negative electrode which has a lower ionization tendency than that of the fuse element 11 and which is close to the fuse element 11. Furthermore, as illustrated in FIG. 5, the switch device 1 may include a first terminal 11a and a second terminal 11b electrically connecting the fuse element 11 and a third terminal 12a connecting the electrode 12 as a negative terminal; the first terminal and the second terminal are connected in series in a current path of the positive electrode, and the third terminal is connected to the negative terminal or grounded.

FIGS. 3 and 4 are perspective views schematically illustrating a fuse element before and after electrical corrosion respectively. As illustrated in FIG. 3, the fuse element 11 maintains a rectangular shape before electrical corrosion. When water enters between the fuse element 11 and the electrode 12, as illustrated in FIG. 4, the fuse element 11 made of a base metal becomes a positive electrode and is ionized (corroded), and the fuse element 11 becomes narrower and/or pinholes are generated. This increases electrical resistance in the fuse element 11 and reduces the rated current. Although water or electrolyte solution between the fuse element 11 and the electrode 12 might evaporate due to heat accompanying this increase in resistance, the reduced rated current enables the fuse element 11 to self-interrupt with current flowing therethrough.

Through Hole, Concave, and Convex

Figure 6A:
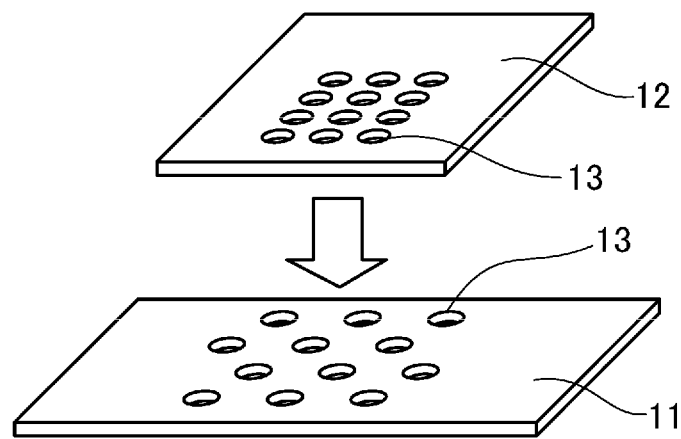
FIG. 6 (A) is a perspective view illustrating a reaction part in which a fuse element and an electrode each have through holes formed therein, and FIG. 6 (B) is a perspective view illustrating a reaction part formed by using a fuse element and an electrode having through holes formed therein.
Figure 6B:
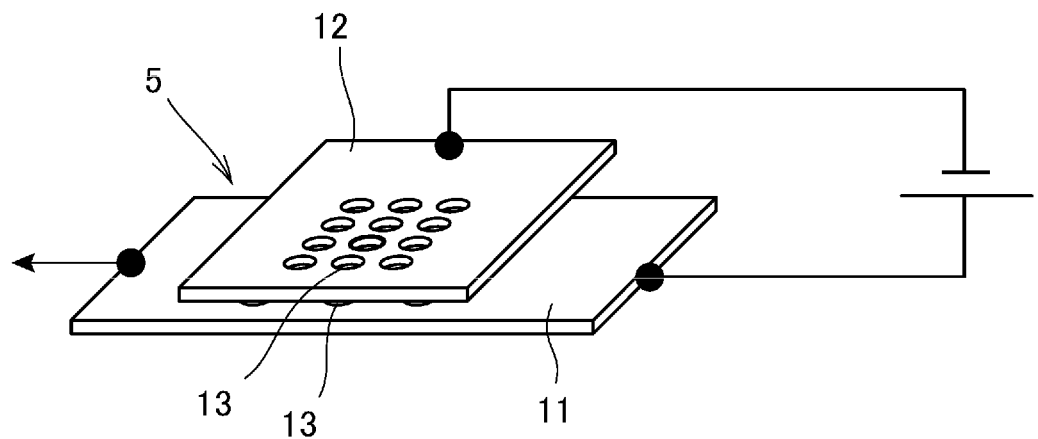

Furthermore, in the reaction part 5, one or a plurality of through holes, concaves, or convexes may be provided in one or both of the fuse element 11 and the electrode 12. As one example, FIGS. 6 (A) and (B) are perspective views illustrating a reaction part 5 provided with through holes 13 formed in the fuse element 11 and the electrode 12. In the switch device 1, this can preferentially guide liquid flowing into the housing 6 to the reaction part 5 as well as improve retention of the liquid; moreover, by increasing the amount of retained liquid with the through holes 13, contact areas of the fuse element 11 and electrode 12 with the liquid are increased, thereby promoting electrical corrosion of the fuse element 11. Still further, forming the through hole 13 in the fuse element 11, reduces cross-sectional area to be blown out, increasing rapidity of blowout.

Likewise, providing a concave or a convex in the switch device 1 can preferentially guide liquid flowing into the housing 6 to the reaction part 5 as well as improve retention of the liquid; furthermore, increased amounts of liquid collected by the concave or the convex leads to increased contact areas of the fuse element 11 and electrode 12 with the liquid, thereby promoting electrical corrosion of the fuse element 11.

Separator

Figure 7:
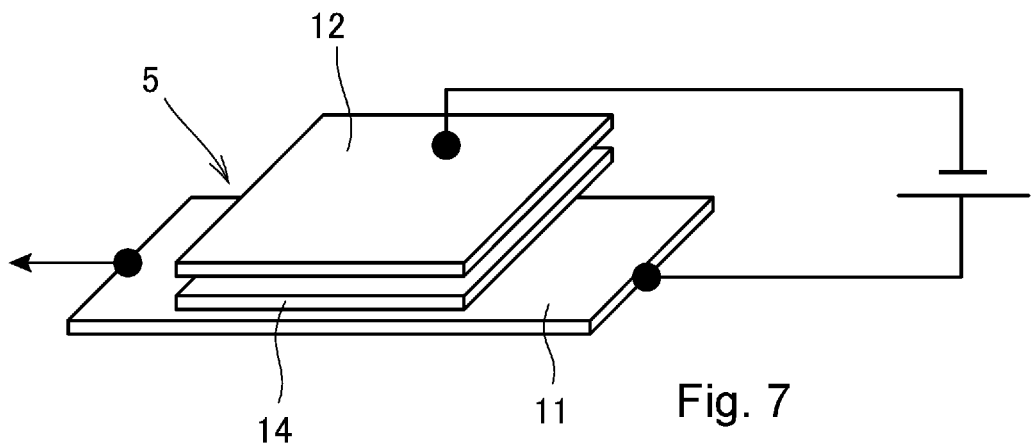
FIG. 7 is a perspective view illustrating a reaction part including a separator between a fuse element and an electrode.

Referring to FIG. 7, it is preferable to provide a separator 14 between the fuse element 11 and the electrode 12. Moreover, the separator 14 preferably has a mesh form or a porous form. This ensures that the separator 14 has a liquid-collecting property and/or water-retaining property of collecting or retaining liquid, for example, water or electrolyte, between the fuse element 11 and electrode 12. Furthermore, the separator 14 is preferably made of an electrically insulating material. The separator 14 can thereby suppress direct short circuits between the fuse element 11 and electrode 12.

Furthermore, the separator 14 preferably carries an electrolyte such as NaCl. This can improve electrical conductivity of water or electrolyte solution and promote corrosion.

Still further, the separator 14 may have a solubility property and dissolve in a liquid such as water or electrolyte solution. In this case, the separator 14 preferably has an electrically insulating property in addition to a solubility property. The separator 14 can thus ensure clearance between fuse element 11 and electrode 12 before entrance of the liquid and prevent short circuits, and, when the liquid enters, the separator 14 dissolves, thereby allowing a greater amount of liquid to be guided between the fuse element 11 and electrode 12 to promote electrical corrosion.

Examples of materials which are liquid-soluble include natural polymers such as agar and gelatin, semisynthetic polymers such as cellulose and starch, and synthetic polymers such as polyvinyl alcohol. These contract or dissolve on contact with a liquid. It should be noted that, because higher molecular weights strengthen a tendency of expanding rather than dissolving, it is preferable to adjust the degree of polymerization. Moreover, as a liquid-soluble material, in the case of using a water-soluble solid such as solidified sugar, the material dissolves or is reduced in volume by coming into contact with a liquid.

Furthermore, assuming an electrolyte solution such as of ethylene carbonate filling a battery cell as the liquid, in the case of a switch device for activating in response to leaking battery electrolyte solution, examples of the liquid-soluble material include ABS, polyacrylonitrile, polyvinylidene fluoride, saturated polyesters such as PET, PTT, and PEN, among others. In these liquid-soluble materials as well, because there are cases in which high molecular weights reduce dissolution rates and thus might reduce the reaction rate in the switch device 1, when giving priority to reaction rates, it is preferable to adjust the degree of polymerization.

Furthermore, the separator 14 disposed between the fuse element 11 and the electrodes 12 may be a water absorbing or hygroscopic electrical insulator. Moreover, an electrical insulator made of a sol, gel, or solid in which electrical conductivity is induced by the liquid may be arranged between the fuse element 11 and the electrode 12. Still further, an electrolyte constituted by a sol or gel may be used which induces electrical corrosion of the fuse element 11 when entering between the fuse element 11 and electrode 12.

Laminated Structure

Figure 8:
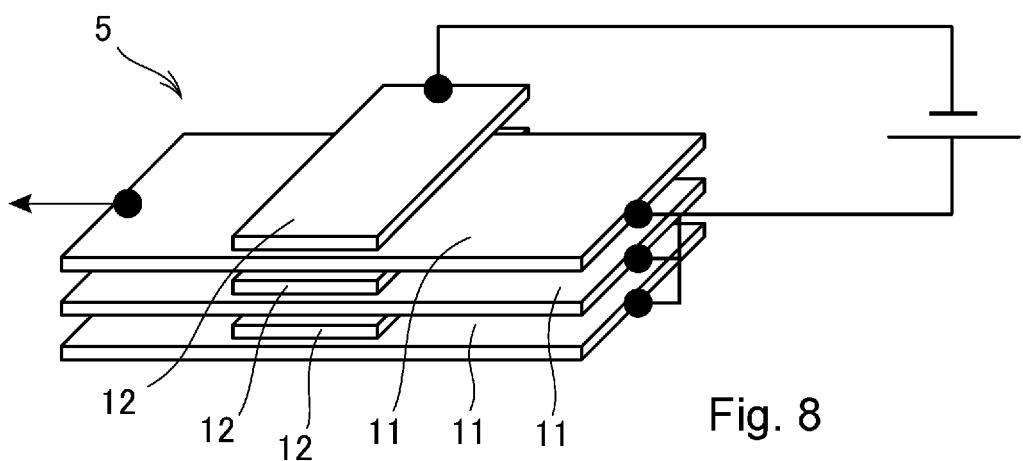
FIG. 8 is a perspective view illustrating an example configuration of a reaction part in which a plurality of fuse elements are arranged to overlap in parallel with a predetermined interval and in which electrodes are arranged between each of the fuse elements.

Furthermore, the first and second conductors 2, 3 and reaction part 5 are not limited to the example configurations described above; for example, a plurality of fuse elements serving as the first conductor 2 may be arranged to overlap in parallel and an electrode serving as the second conductor 3 may be arranged between each of the fuse elements. FIG. 8 is a perspective view illustrating an example configuration of the reaction part 5; a plurality of fuse elements 11 serving as the first conductor 2 are formed in flat-plate shapes and overlap in parallel with a predetermined interval therebetween; electrodes 12 serving as the second conductor 3 are formed in a flat-plate shape and disposed between each of the fuse elements 11.

This reaction part 5 has a laminated structure in which three fuse elements 11 and three electrodes 12 are alternately laminated. Each of the fuse elements 11 and electrodes 12 are connected in respective parallel connections.

Arranging a plurality of the fuse elements 11 in this manner enables increases in current ratings and promotes electrical corrosion of the fuse element 11 when liquid enters between the fuse element 11 and electrode 12.

Figure 9:
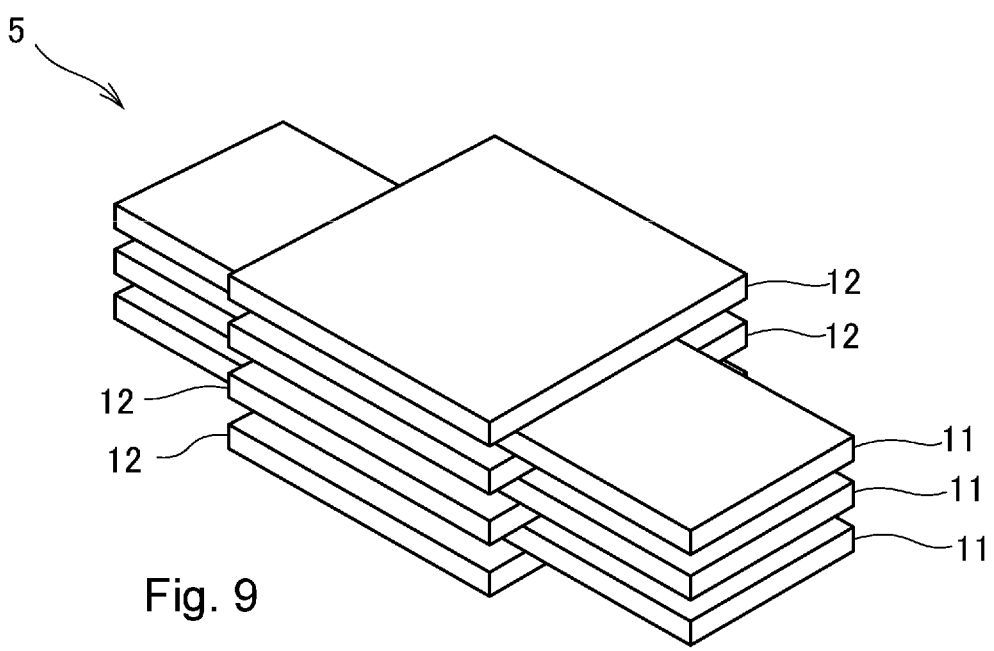
FIG. 9 is a perspective view illustrating an example configuration of a reaction part in which, in addition to arranging a plurality of fuse elements to overlap in parallel with a predetermined interval, the number of electrodes is one more than the number of fuse elements and both surfaces of each of the fuse elements are faced by the electrodes.

As illustrated in FIG. 9, the first and second conductors 2, 3 and the reaction part 5 may include a plurality of fuse elements 11 formed in a flat-plate shape arranged to overlap in parallel with a predetermined interval therebetween; a number in which the electrodes 12 are formed in a flat-plate shape may be one greater than the number of fuse elements 11, the electrodes 12 being situated between each of the fuse elements 11 so as to face and overlap both sides of each of the fuse elements 11.

In the reaction part 5, by each of the fuse elements 11 being faced on both sides by the electrodes 12, liquid is allowed between the electrodes 12 and both sides of each fuse element 11, thereby promoting electrical corrosion of the fuse elements 11.

Furthermore, the laminated structure of the reaction part 5 illustrated in FIGS. 8 and 9 may be provided with one or a plurality of through holes 13, concaves, or convexes in either or both of the fuse elements 11 and electrodes 12.

Still further, in the reaction part 5 illustrated in FIGS. 8 and 9, the separator 14 described above may be provided between the fuse elements 11 and electrodes 12. Thereby, a direct short circuit between the fuse elements 11 and electrodes 12 can be avoided and retention of water or electrolyte can be ensured. In this case, as the separator 14, a mesh form or a porous form may be used, and an electrically insulating material may be used. Furthermore, the separator 14 may carry an electrolyte such as NaCl to improve electrical conduction of water or electrolyte and promote electrical corrosion. Moreover, as described above, the separator 14 may be of a water absorbing or hygroscopic electrical insulator. Additionally, an insulator made of a sol, gel, or solid in which electrical conductivity is induced by the liquid may be arranged between the fuse elements 11 and electrodes 12. Still further, an electrolyte constituted by a sol or gel may be used which induces electrical corrosion of the fuse element 11 when entering between the fuse element 11 and electrode 12.

Reaction Part Gap

Figure 10A:
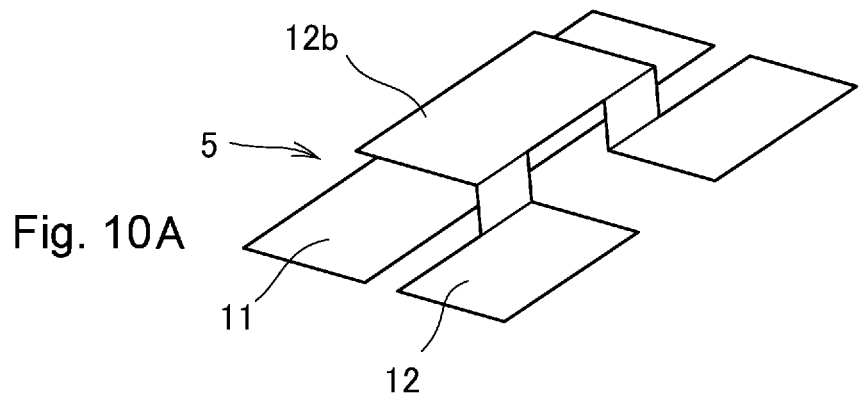
FIG. 10 illustrates an example configuration of a reaction part in which a fuse element and an electrode are adjacently arranged, and the fuse element and the electrode face each other in the reaction part so that the reaction part has a relatively narrow gap in (A) a perspective view, (B) a plan view, and (C) a cross-sectional view.
Figure 10B:
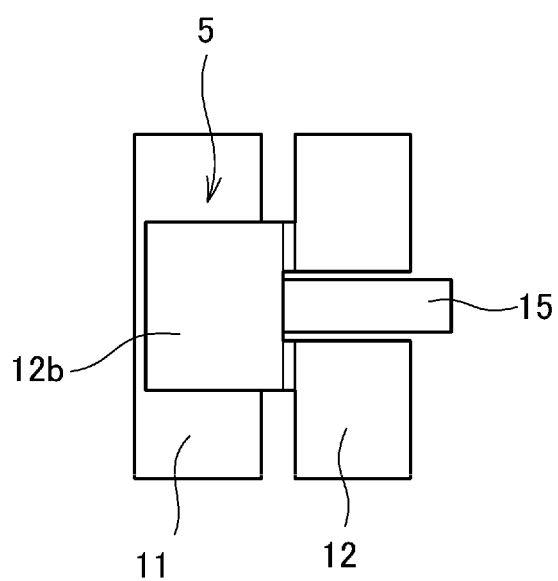
Figure 10C:
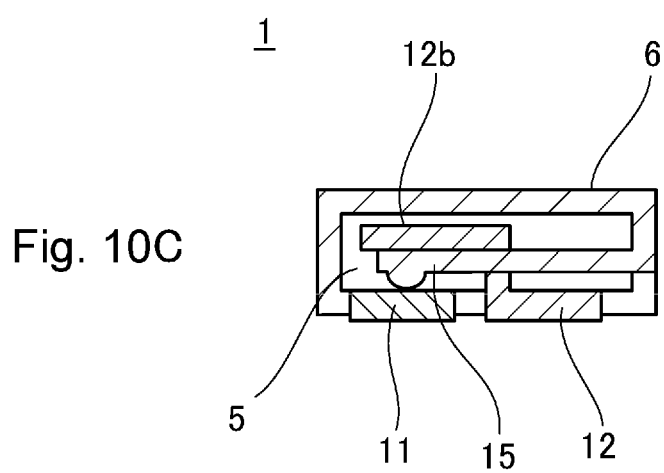

In the switch device 1, a gap between the first and second conductors 2, 3 in a region in the vicinity of the reaction part 5 may be relatively narrower in comparison to that in other regions. For example, in the switch device 1, as illustrated in FIG. 10 (A) to (C), a rectangular-plate-shaped fuse element 11 serving as the first conductor 2 and a substantially plate-shaped electrode 12 serving as the second conductor 3 are adjacently disposed within the housing 6; the fuse element 11 and electrode 12 overlap in the reaction part 5 to form a relatively narrower gap.

An overlapping portion 12b which protrudes above the fuse element 11 is formed in a substantially central portion of the electrode 12. In the switch device 1, by arranging the overlapping portion 12b of the electrode 12 to oppose and be close to the fuse element 11, the reaction part 5 which collects liquid and electrically corrodes the fuse element 11.

The overlapping part 12b is supported by a support 15 provided, for example, in the housing 6, so as to oppose the fuse element 11 and is provided with a predetermined gap which allows entrance and retention of a liquid. The gap between the fuse element 11 and the overlapping part 12b is preferably 0.01 to 10 mm. Furthermore, because reducing distance between the fuse element 11 and the electrode 12 increases electric field intensity and corrosive action as well as capillary action which promotes guidance of water between the fuse element 11 and the electrode 12, it is more preferable that the gap between the fuse element 11 and the overlapping part 12b be 0.01 to 1 mm to more efficiently open the electrical circuit.

Figure 11A:
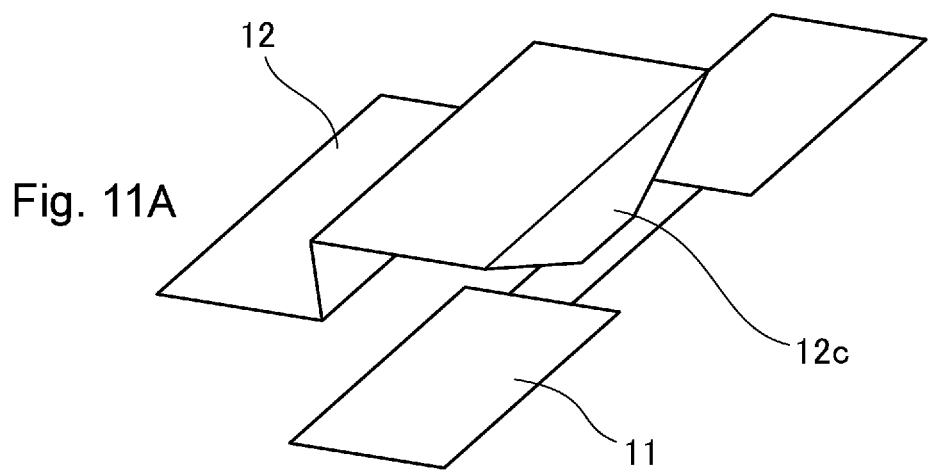
FIG. 11 illustrates an example configuration of a reaction part in which a fuse element and an electrode are adjacently arranged, and a tip of the electrode linearly opposes the fuse element in the reaction part so that the reaction part has a relatively narrow gap in (A) a perspective view and (B) a cross-sectional view.
Figure 11B:
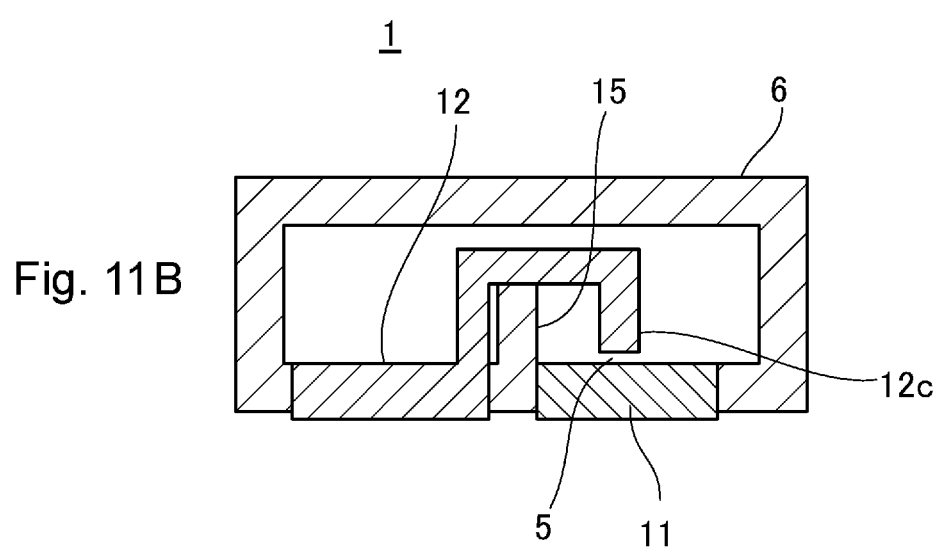

Moreover, in the switch device 1, as illustrated in FIGS. 11 (A) and (B), the fuse element 11 and the electrode 12 are adjacently arranged, and a tip 12c of the electrode 12 may be bent and the electrode 12 supported by a support 15 so that an end of the tip 12c linearly opposes the fuse element 11 from above a surface of the fuse element 11 with a predetermined gap.

Plurality of Facing Surfaces

Figure 12A:
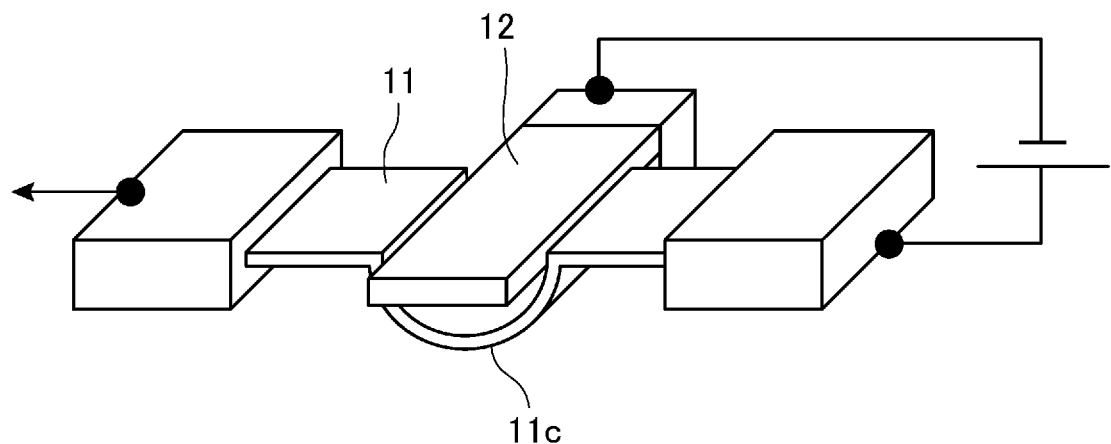
FIG. 12 illustrates a reaction part in which a fuse element and an electrode are facing with respect to multiple surfaces in perspective views of (A) a configuration in which a curved portion is formed in the fuse element so as to surround three surfaces, or both side surfaces and a bottom surface, of the electrode and (B) a configuration in which a bent portion is formed in the fuse element so as to surround three surfaces, or both the side surface and a bottom surface, of the electrode.
Figure 12B:
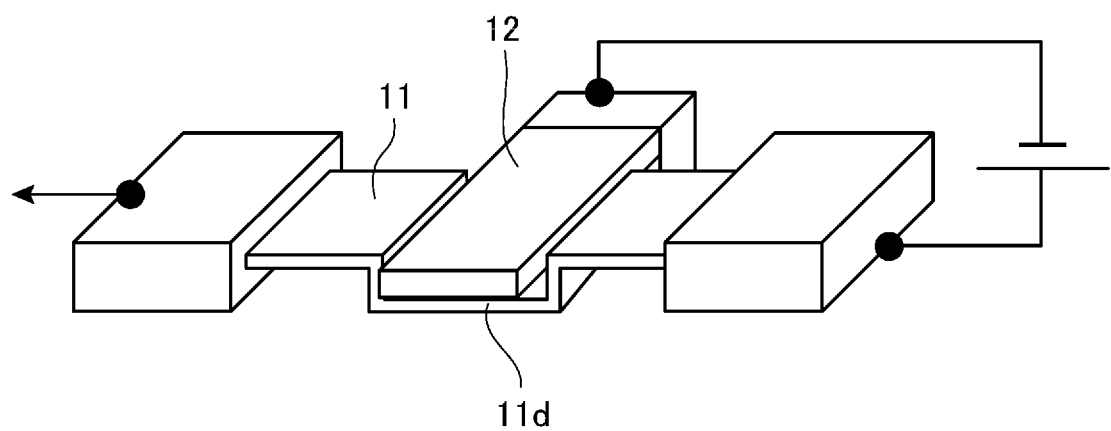

In the switch device 1, a plurality of surfaces of the first conductor 2 and the second conductor 3 may be in opposition. For example, in the switch device 1, as illustrated in FIG. 12 (A), a substantially rectangular-plate-shaped fuse element 11 serves as the first conductor 2 and a substantially rod-shaped electrode 12 serves as the second conductor 3; in the fuse element 11 by forming a curved portion 11c which is curved so as to surround three surfaces, or both side surfaces and a bottom surface, of the electrode 12, a plurality of surfaces of the electrode 12 may face the fuse element 11. Alternatively, in the switch device 1, as illustrated in FIG. 12 (B), by forming a bent portion 11d in the fuse element 11 which is bent so as to surround three surfaces, or both side surfaces and a bottom surface, of the electrode 12, a plurality of surfaces of the fuse element 11 and electrode 12 may face each other. Between the curved portion 11c or the bent portion 11d of the fuse element 11 and the electrode 12, surfaces of both face each other across a predetermined interval allowing liquid to enter and be retained.

According to this reaction part 5, facing a plurality of surfaces of the fuse element 11 and electrode 12 with each other in the switch device 1 increases surface area on which liquid is held in comparison with configurations having only one surface facing another, and it is thereby possible to better promote blowout with electrical corrosion of the fuse element 11.

It should be noted that, in the reaction part 5, a curved portion or a bent portion may be formed in the second conductor 3 so as to surround three surfaces, or both side surfaces and a bottom surface, of the first conductor 2 so that a plurality of surfaces are in opposition.

Liquid-soluble Material Coating

Figure 13:
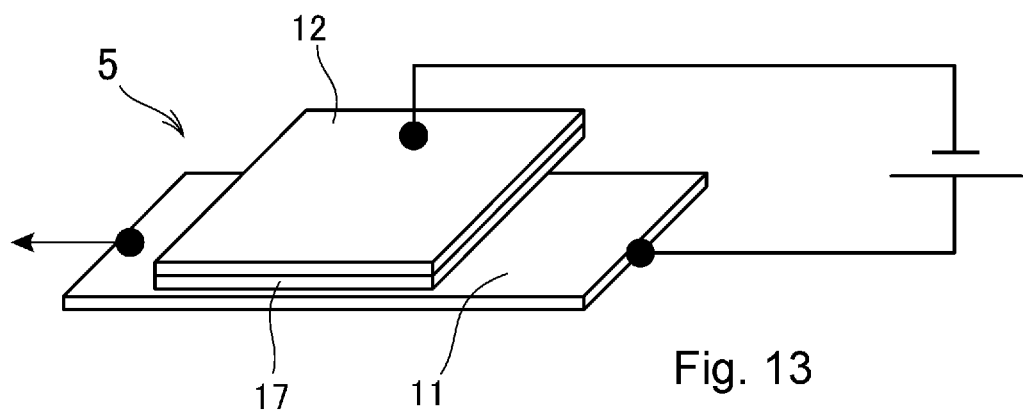
FIG. 13 is a perspective view illustrating an example configuration of a reaction part in which a coating layer made of a liquid-soluble material is formed on one surface of an electrode facing a fuse element.

In the switch device 1, the surface of at least one of the first and second conductors 2, 3 constituting the reaction section 5 may be coated with a liquid-soluble material which dissolves on contact with a liquid such as water or an electrolyte solution. For example, in an embodiment of the switch device 1 illustrated in FIG. 13, a substantially rectangular-plate-shaped fuse element 11 serving as the first conductor 2 and a substantially rectangular-plate-shaped electrode 12 serving as the second conductor 3 may be arranged to face each other, and a coating layer 17 made of a liquid-soluble material is formed on one surface of the electrode 12 which faces the fuse element 11.

In the switch device 1, this can ensure clearance between the fuse element 11 and the electrode 12 before entrance of the liquid and prevent short circuits, and when the liquid enters, the coating layer 17 dissolves; a greater amount of liquid can thus be guided between the fuse element 11 and the electrode 12 to promote electrical corrosion.

As the liquid-soluble material constituting the coating layer 17, the same liquid-soluble materials as used to form the above-described separator 14 can be used.

Furthermore, the coating layer 17 made of the liquid-soluble material may be formed on one surface of the fuse element 11 facing the electrode 12 or may be formed on mutually facing surfaces of the fuse element 11 and the electrode 12.

Water Repellent Treatment

Figure 14:
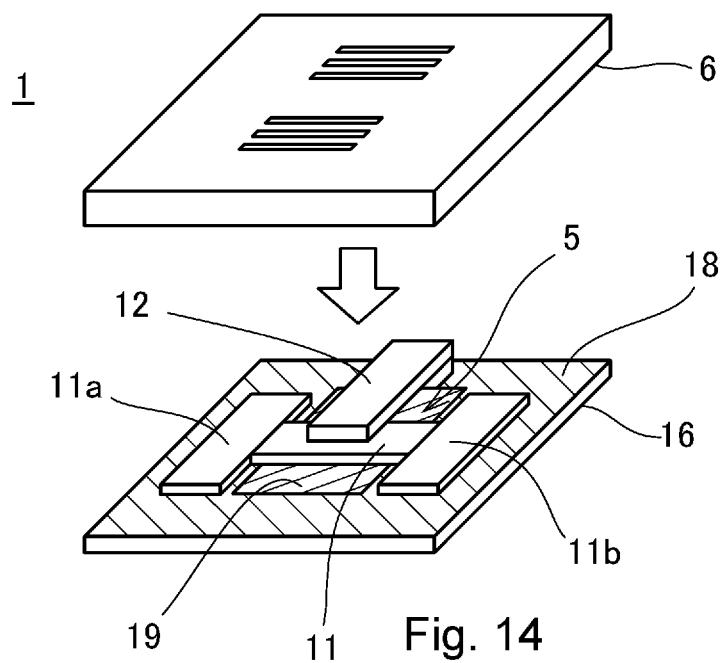
FIG. 14 is an exploded perspective view of a switch device provided with a water repellent treatment portion in a location other than the reaction part of an insulating substrate and the vicinity thereof and provided with a water-absorbing and heat-generating material in the vicinity of the reaction part.
Figure 15A:
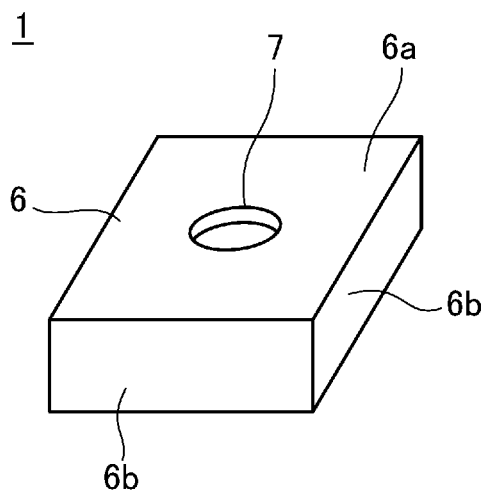
FIG. 15 illustrates a housing of a switch device in perspective views of (A) a configuration having a guiding inlet formed on a top surface, (B) a configuration having a plurality of guiding inlets formed on a top surface, (C) a configuration having a guiding inlet on a top surface and a side surface, and (D) a configuration having a plurality of guiding inlets formed on a top surface and side surfaces.
Figure 15B:
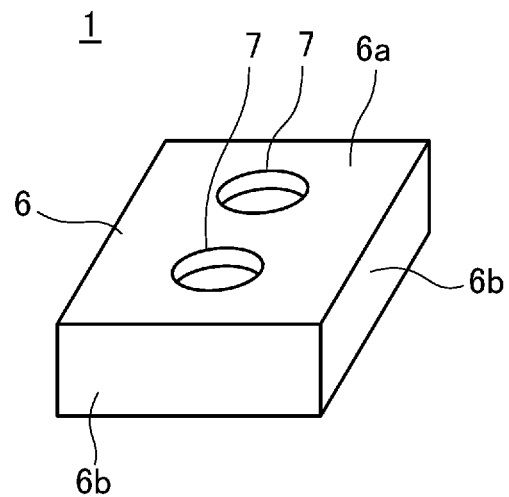
Figure 15C:
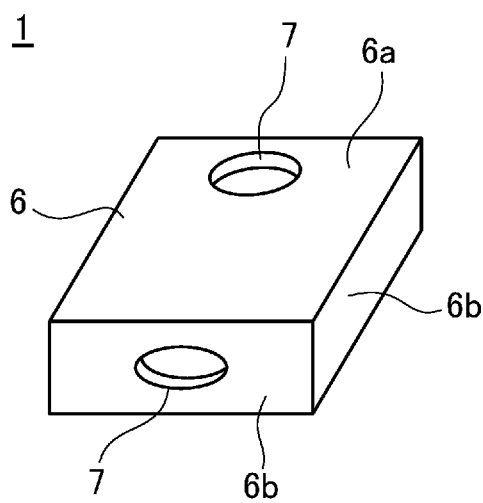
Figure 15D:
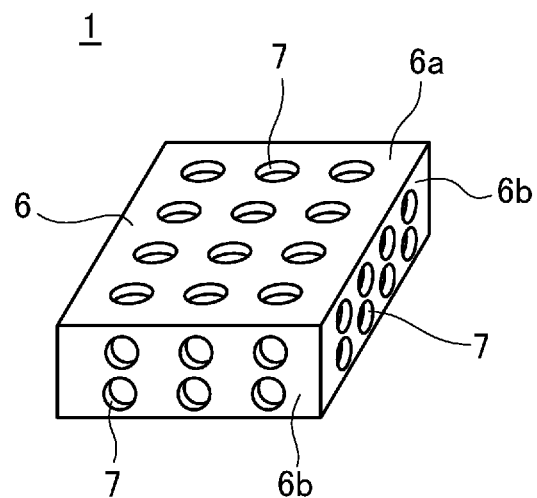

Furthermore, in the switch device 1, a water repellent region may be provided in a location other than the reaction part 5, or in a location other than the reaction part 5 and the vicinity thereof. For example, in the switch device 1, as illustrated in FIG. 14, a substantially rectangular-plate-shaped fuse element 11 serving as the first conductor 2 and a substantially rectangular-plate-shaped electrode 12 serving as the second conductor 3 are arranged in opposition, and the fuse element 11 and the electrode 12 are mounted on an electrically insulating substrate 16 disposed in the housing 6. Furthermore, in the switch device 1, a region other than the reaction part 5, in which the fuse element 11 of the insulating substrate 16 and the electrode 12 are close to each other, and the vicinity thereof is defined as a water repellent treatment portion 18.

The water repellent treatment portion 18 can be formed using well-known methods such as applying a fluorine-based coating agent or a solder paste coating.

Thereby, the switch device 1 can guide liquid intruding onto the insulating substrate 16 to the reaction part 5 and the vicinity thereof, which is a non-water repellent region, thereby promoting blowout caused by electrical corrosion of the fuse element 11.

Water-absorbing Heat-generating Material

Further, in the switch device 1, a water-absorbing and heat-generating material 19 may be arranged in the vicinity of the reaction part 5. For example, a configuration of the switch device 1 illustrated in FIG. 14 has the fuse element 11 disposed on a surface of the insulating substrate 16 so as to oppose the electrode 12, and a material 19 which generates heat by absorbing water is arranged in a neighboring region from which heat is transferred to the reaction part 5. As the water-absorbing and heat-generating material 19, for example, quicklime (calcium oxide) can be used.

In such a switch device 1, when liquid enters the vicinity of the reaction part 5, the water-absorbing and heat-generating material 19 absorbs moisture and generates heat which is transferred to the reaction part 5. Heat from the water-absorbing and heat-generating material 19 improves reaction efficiency in the reaction part 5, thus enabling rapid electrical corrosion and blowout of the fuse element 11.

As illustrated in FIG. 14, the switch device 1 may be provided with the water repellent treatment portion 18 in a region of the insulating substrate 16 excluding the reaction part 5 and the vicinity thereof, the water-absorbing and heat-generating material 19 may be arranged in the vicinity of the reaction part 5, or either the water repellent treatment portion 18 or the water-absorbing and heat-generating material 19 may be provided.

Housing

Next, the housing 6 of the switch device 1 will be described. The housing 6 of the switch device 1 can be formed from an electrically insulating material such as various engineering plastics, and ceramics, among other materials. By providing the switch device 1 with the housing 6, in addition to protecting the first and second conductors 2, 3 and the reaction part 5 from external mechanical disturbances, it is possible to prevent scattering of melted metal to the surroundings accompanying arc-discharge caused by blowout of the fuse element 11 used as the first conductor 2.

The housing 6 has a guiding inlet 7 for guiding liquid to the reaction part 5. In the switch device 1, liquid entering the reaction part 5 via the guiding inlet 7 of the housing 6 irreversibly interrupts the first conductor 2.

For example, as illustrated in FIG. 15 (A), the housing 6 is polyhedral and has a guiding inlet 7 on one side. In the case of forming the switch device 1 as a chip component for mounting on a circuit substrate on which the external circuit is formed, it is preferable to provide the guiding inlet 7 on a top surface 6a which is opposite to a mounting surface of the housing 6. Providing the guiding inlet 7 on the top surface 6a allows efficient intake of liquid into the housing 6 in a wet state and retention of liquid in the reaction part 5, allowing interruption of the first conductor 2. It is a matter of course that the housing 6 may have the guiding inlet 7 on a surface other than the top surface 6a, for example, a side surface 6b. Furthermore, as illustrated in FIG. 15 (B), the housing 6 may have a plurality of guiding inlets 7 on the top surface 6a or may have a plurality of guiding inlets 7 on the side surface 6b. Providing a plurality of the guiding inlets 7 in the housing 6 promotes guidance of water into the reaction part 5.

Moreover, the housing 6, as illustrated in FIG. 15 (C), may be polyhedral and provided with the guiding inlet 7 on a plurality of surfaces, for example, on a top surface 6a and a side surface 6b. Furthermore, as illustrated in FIG. 15 (D), one or a plurality of the guiding inlet 7 may be formed on each of a plurality of surfaces of the housing 6.

Figure 16:
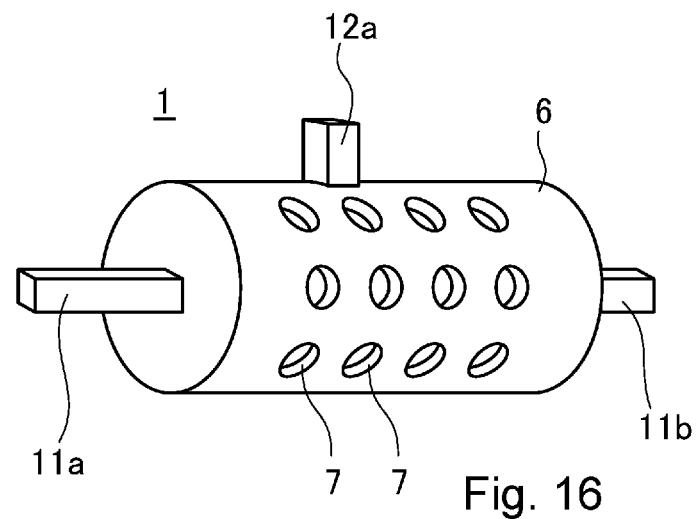
FIG. 16 is a perspective view illustrating a switch device employing a round tube-shaped housing.

Furthermore, the housing 6 may be a tube shape and the guiding inlet 7 may be formed in any position and in any number. FIG. 16 is an external perspective view of the switch device 1 in which the housing 6 is formed in a round tube shape and a plurality of the guiding inlets 7 are formed around the entire circumference. The housing 6 may also be formed into a hollow polygonal prism shape. By forming the housing 6 in a cylinder or prism shape, the guiding inlets 7 can be formed irrespective of surfaces/angles and liquid entrance path which would otherwise depend on orientation of the switch device 1.

It should be noted that the switch device 1 illustrated in FIG. 16 includes a first terminal 11a and a second terminal 11b which electrically connect the fuse element 11 used as the first conductor 2 and includes a third terminal 12a connecting the electrode 12 used as the second conductor 3 as a negative electrode formed on an outer circumference surface of the housing 6.

Figure 17:
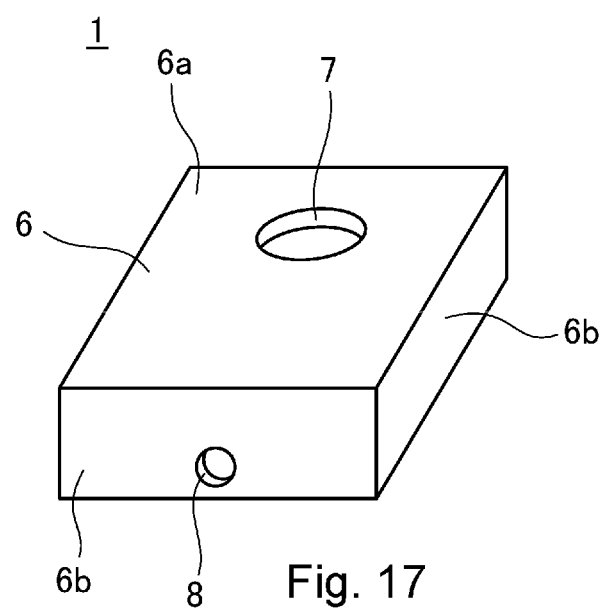
FIG. 17 is a perspective view illustrating a switch device employing a housing in which a discharging outlet is formed.

Furthermore, a discharging outlet may be formed in the housing 6 for discharging liquid entering via the guiding inlet 7. FIG. 17 is an external perspective view illustrating the switch device 1 provided with the housing 6 in a polyhedral shape having the guiding inlet 7 formed on the top surface 6a and a discharging outlet 8 for discharging liquid formed on a side surface 6b. By forming the discharging outlet 8, it is possible to prevent a situation in which a large amount of liquid entering the housing 6 cools the first and second conductors 2, 3 and reaction part 5, thus interfering with electrical corrosion/self-generated heat of the fuse element 11 and impeding action of the reaction part 5 or blowout of the first conductor 2.

It should be noted that the discharging outlet 8 is preferably formed to be smaller than the guiding inlet 7. By making the discharging outlet 8 relatively small, it is possible to prevent excessive discharge of liquid entering the housing 6 from causing a delay in the action of the reaction part 5 or in blowout of the first conductor 2.

Figure 18:
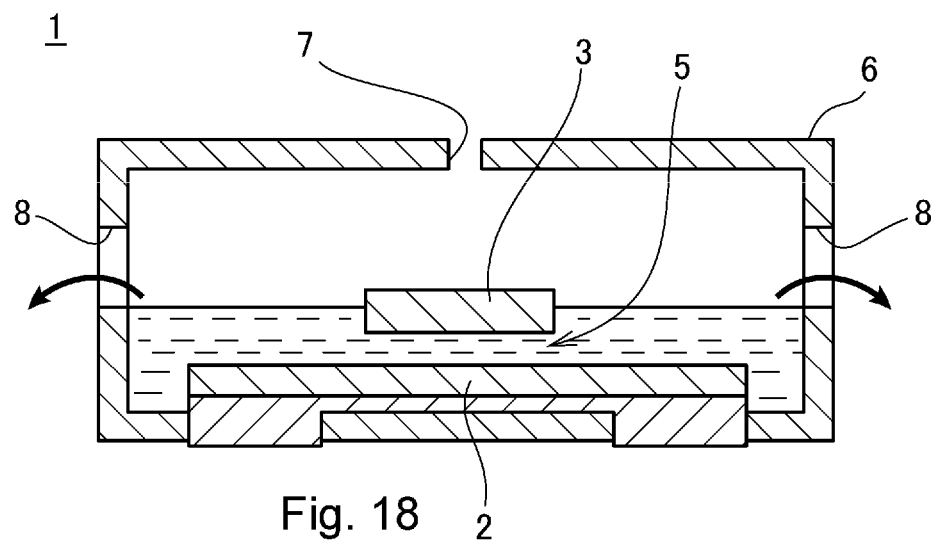
FIG. 18 is a cross-sectional view illustrating a switch device in which a discharging outlet is provided at the same height as the reaction part.

Furthermore, the discharging outlet 8 is preferably provided at the same height as the reaction part 5 of the housing 6 or higher than the position of the reaction part 5. For example, as illustrated in FIG. 18, the housing 6 is formed in a polyhedral shape and, in the case of being formed as a chip component for mounting on a circuit substrate, it is preferable to provide the discharging outlet 8 on the side surface 6b of the housing 6 at the same height or higher than the position at which the reaction part 5 is provided. Thereby, liquid entering the housing 6 remains in the reaction part 5 while portions above the reaction part 5 are drained, which can ensure action of the reaction part 5 and prevent situations in which an excessive amount of liquid entering the housing 6 cools the first and second conductors 2, 3 and reaction part 5, thus interfering with electrical corrosion/self-generated heat of the fuse element 11 and impeding action of the reaction part 5 or blowout of the first conductor 2.

It should be noted that the guiding inlet 7 for guiding liquid and the discharging outlet 8 for discharging liquid may be any shape, for example, circular or rectangular.

Figure 19:
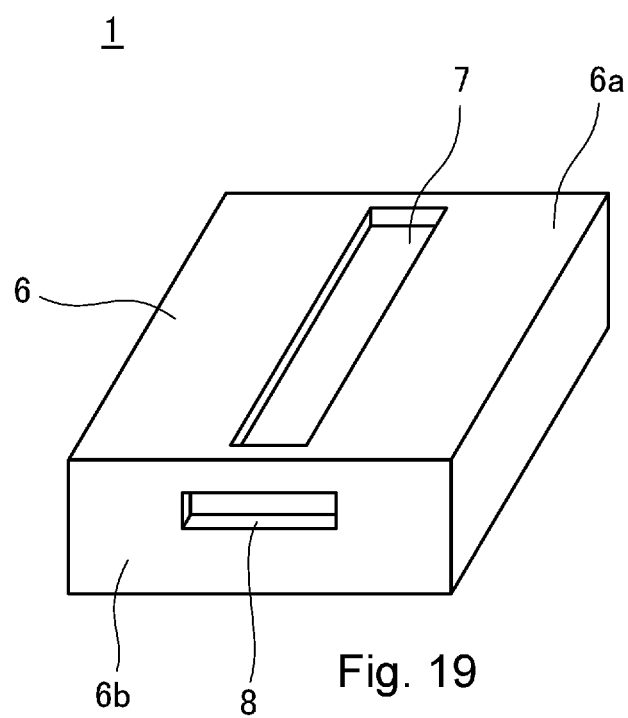
FIG. 19 is a perspective view illustrating a switch device employing a housing in which a slit-shaped guiding inlet and a slit-shaped discharging outlet are formed.

Furthermore, as illustrated in FIG. 19, the guiding inlet 7 and the discharging outlet 8 may be formed in a slit shape. Forming the guiding inlet 7 in a slit shape can guide liquid over a wider range, enabling rapid reaction in the reaction part 5 and interruption of the first conductor 2. Moreover, by forming the discharging outlet 8 in a slit shape, it is possible to rapidly drain excess liquid entering the housing 6 and prevent delays in action of the reaction part 5 or progress of blowout of the first conductor 2.

Figure 20A:
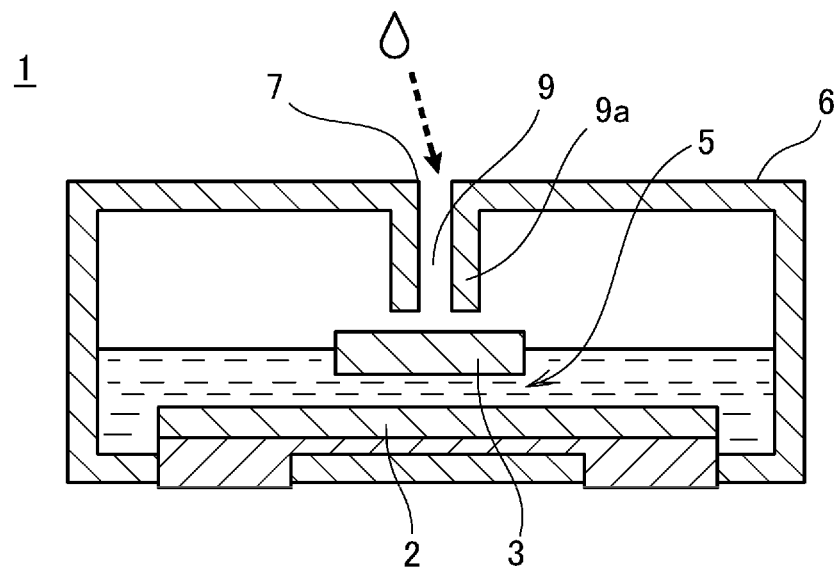
FIG. 20 illustrates a switch device employing a housing provided with a guiding conduit in (A) a cross-sectional view and (B) an external perspective view.
Figure 20B:
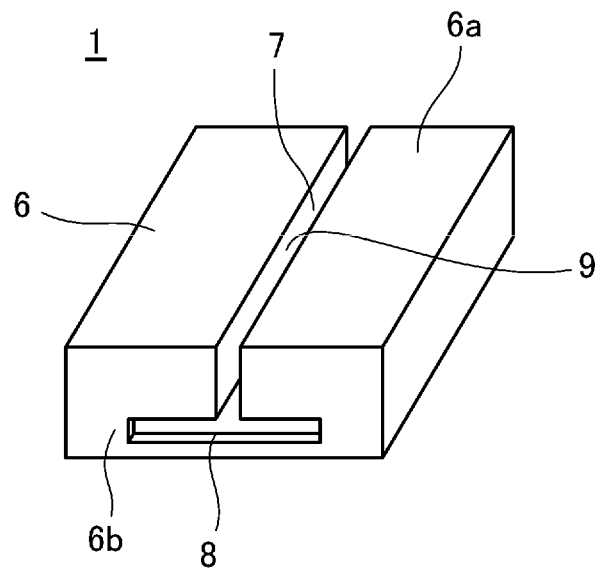

In addition to providing the housing 6 with a slit-shaped guiding inlet 7 on the top surface 6a, the housing 6 may be provided with a guiding conduit 9 for guiding the liquid to the reaction part 5. As illustrated in FIGS. 20 (A) and (B), the guiding conduit 9 has a conduit wall 9a extending from the guiding inlet 7 formed in the top surface 6a to the vicinity of the reaction part 5. This ensures that liquid entering the housing 6 via the guiding inlet 7 is guided to the reaction part 5 and does not flow to locations other than the reaction part 5. This also prevents scattering of liquid entering the housing 6 via the guiding inlet 7, thus preventing delays in blowout of the first conductor 2 by the reaction part 5.

Furthermore, as illustrated in FIG. 20 (B), in the housing 6, the guiding conduit 9 may extend to the side surface 6b and made continuous with the discharging outlet 8 formed in the side surface 6b. Thereby, in the housing 6, liquid entering via the guiding inlet 7 can be efficiently guided to the reaction part 5 and excess liquid can be efficiently drained via the discharging outlet 8.

Figure 21A:
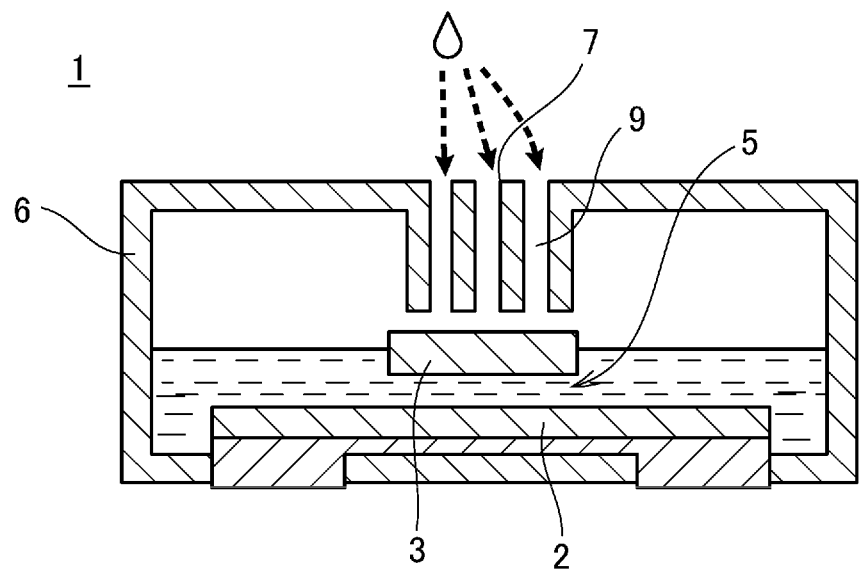
FIG. 21 illustrates a switch device employing a housing provided with a plurality of guiding conduits in (A) a cross-sectional view and (B) an external perspective view.
Figure 21B:
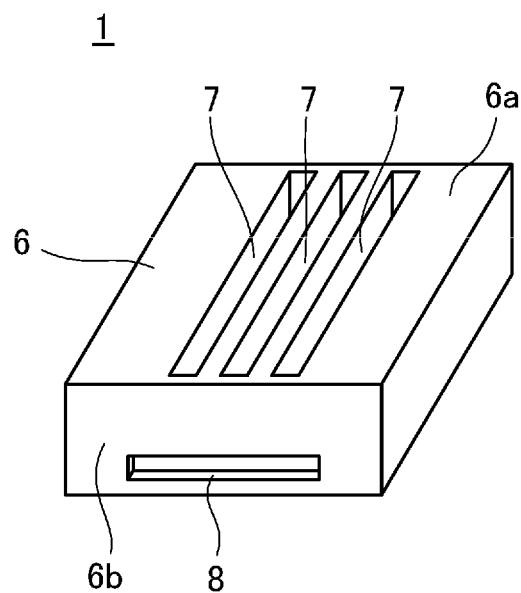

It should be noted that, as illustrated in FIGS. 21 (A) and (B), a plurality of the guiding conduits 9 may be formed. By forming a plurality of the guiding conduits 9, it is possible to guide the liquid across the entire width of the reaction part 5.

Figure 22:
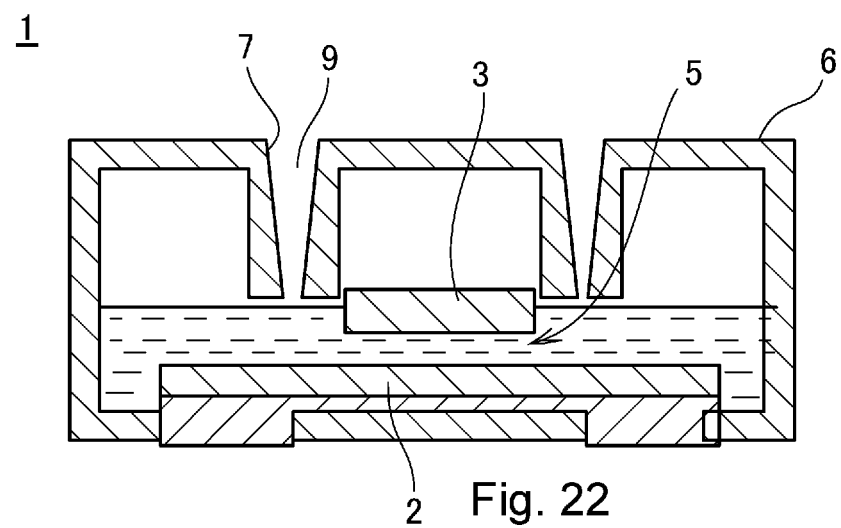
FIG. 22 is a cross-sectional view illustrating a switch device employing a housing having a guiding conduit which progressively narrows towards the interior in which a reaction part is provided.

Moreover, as illustrated in FIG. 22, the guiding conduit 9 may progressively narrow from the opening of the guiding inlet 7 in the top surface 6a towards the interior in which the reaction part 5 is provided. By the guiding conduit 9 tapering as it approaches the reaction part 5, it is possible to efficiently guide liquid entering via the opening of the guiding inlet 7 to the reaction part 5 by using capillary action.

Figure 23:
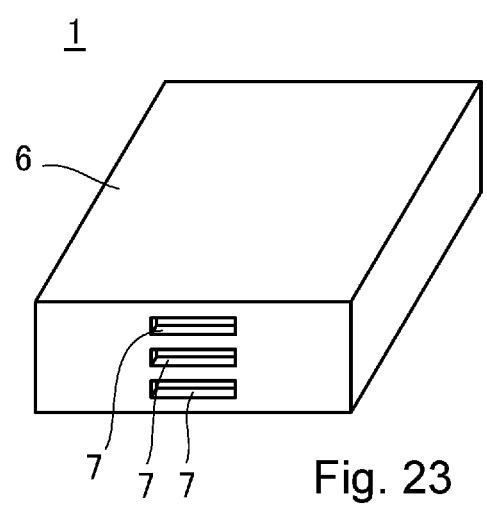
FIG. 23 is a perspective view illustrating a switch device employing a housing in which guiding inlets are formed at heights corresponding to positions of a conductor and a reaction part.

Furthermore, in the switch device 1, as illustrated in FIG. 23, the guiding inlet 7, or the guiding inlet 7 and the guiding conduit 9, may be formed in the housing 6 in a position in accordance with the first and second conductors 2, 3 and the reaction part 5. In the switch device 1, for example, as in the example configuration of the first and second conductors 2, 3 and reaction part 5 illustrated in FIGS. 8 and 9, together with laminating the plurality of fuse elements 11 and electrodes 12 in parallel, the guiding inlet 7, or the guiding inlet 7 and the guiding conduit 9, may be formed in the side surface 6b at a height corresponding to the position of the fuse element 11 and the electrode 12. In this case, one or a plurality of the guiding inlet 7 may be formed according to the number of fuse elements 11; moreover, the same number of guiding inlets 7 may be formed as the number of fuse elements 11 and a plurality of the guiding inlets 7 may be formed at the same interval as the fuse element 11.

Forming the guiding inlet 7 in a position corresponding to the position of the reaction part 5 enables effective guidance of a large volume of liquid via the guiding inlet 7 to the first and second conductors 2, 3 and reaction part 5 in the switch device 1, thereby increasing efficiency of the reaction in the reaction part 5 and promoting blowout of the first conductor 2.

Figure 24:
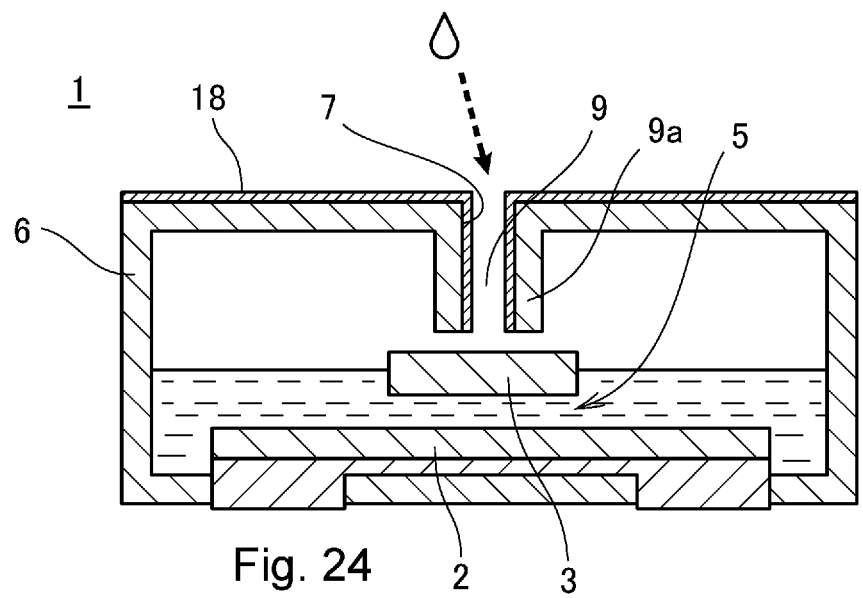
FIG. 24 is a cross-sectional view illustrating a switch device employing a housing provided with a water repellent treatment portion in a location other than the reaction part.

Furthermore, liquid may be led to the reaction part 5 in the switch device 1 by subjecting a location other than the reaction part 5 to a water repellent treatment. For example, as illustrated in FIG. 24, in the switch device 1, a water repellent treated portion 18 subjected to a water repellent treatment may be formed in the guiding inlet 7, or on the guiding inlet 7 and conduit wall 9a of the guiding conduit 9. The water repellent treatment portion 18 can be formed using well-known methods such as applying a fluorine-based coating agent or a solder paste coating.

It is thereby possible to efficiently guide liquid entering via the guiding inlet 7 to the reaction part 5 in the switch device 1. In addition, by subjecting the guiding inlet 7 or the guiding conduit 9 to a water repellent treatment, in states other than wet states which should activate the switch device 1, small volumes of liquid can be repelled and not allowed to enter the housing 6, thereby preventing improper activation and ensuring reliability as a sensor.

Moreover, in the switch device 1, an interior wall of the housing 6 may be subjected to a water repellent treatment. By subjecting the interior wall of the housing 6 to a water repellent treatment, liquid entering the housing 6 can be efficiently guided to the reaction part 5 so that action of the reaction part 5 can occur rapidly.

Figure 25:
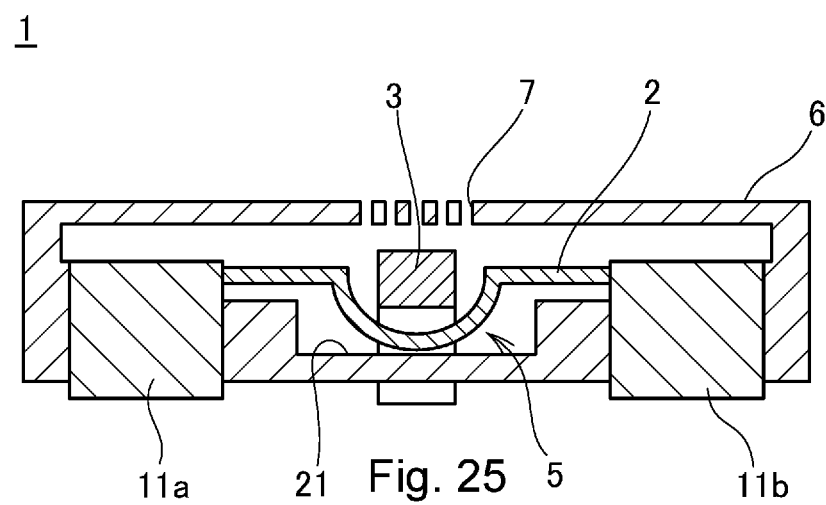
FIG. 25 is a cross-sectional view illustrating a switch device provided with a reservoir which accumulates liquid in a position corresponding to the reaction part.

Furthermore, as illustrated in FIG. 25, the switch device 1 may be provided with a reservoir 21 at a position at which the reaction part 5 is provided for accumulating liquid entering the housing 6. The reservoir 21 is formed in a concave shape so as to surround the reaction part 5 and may be formed integrally in the housing 6 or may be a concave member arranged on the floor surface of the housing 6. In the switch device 1, when liquid enters the housing 6, the liquid accumulates in the reservoir 21 so that the periphery surrounding the reaction part 5 fills with liquid. Thereby, in the switch device 1, even in the case of a small amount of liquid entering the housing 6, an effective reaction can be enabled in the reaction part 5. Furthermore, in the switch device 1, the discharging outlet 8 can be formed below the reaction part 5 to discharge excess liquid.

It should be noted that, in the switch device 1 as illustrated in FIG. 25, in addition to the first conductor 2 being curved and passing through the reservoir 21, both ends of the first conductor 2 are connected to first and second terminals 11a, 11b exposed on a bottom surface of the housing 6.

Figure 26:
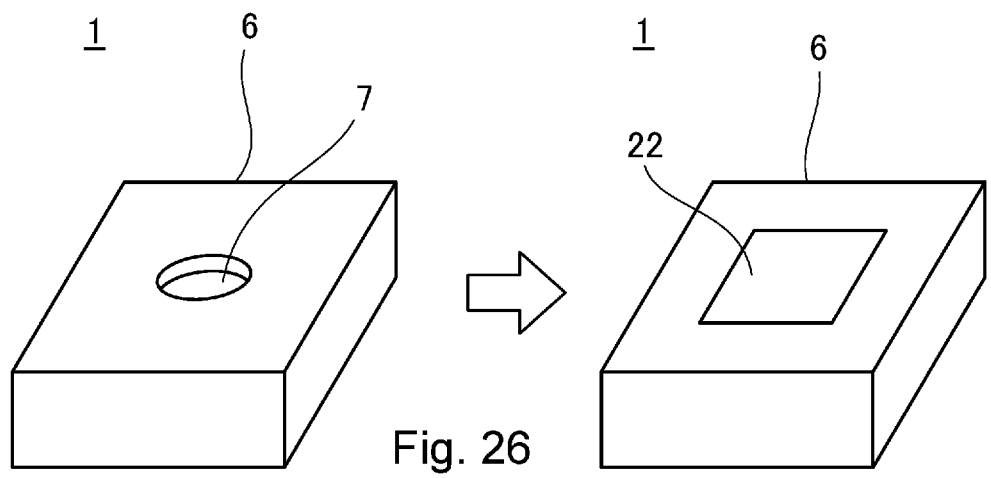
FIG. 26 is a perspective view illustrating a switch device employing a housing in which a guiding inlet is sealed with a water-soluble insulating material.
Figure 27:
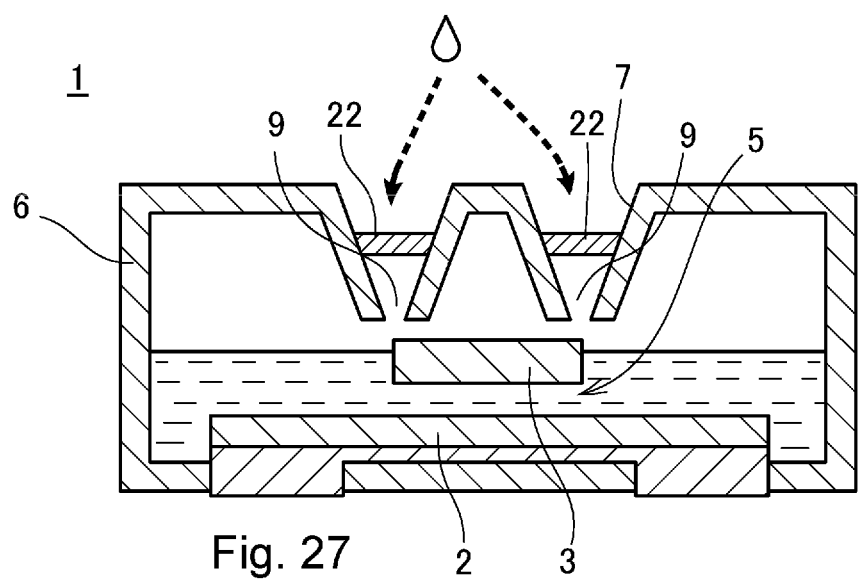
FIG. 27 is a cross-sectional view illustrating a switch device in which a guiding conduit is sealed with a water-soluble insulating material.

As illustrated in FIG. 26, in the switch device 1, the guiding inlet 7 may be blocked by a water-soluble sealing material 22 which is soluble in a liquid. Furthermore, as illustrated in FIG. 27, in the switch device 1, the guiding conduit 9 may be blocked by the water-soluble sealing material 22 which is soluble in a liquid. Examples of the water-soluble sealing material 22, as in the liquid-soluble material described above, include natural polymers such as agar and gelatin, semisynthetic polymers such as cellulose and starch, and synthetic polymers such as polyvinyl alcohol, as well as water-soluble solids such as solidified sugar.

Furthermore, assuming an electrolyte solution such as of ethylene carbonate filling a battery cell as the liquid, in the case of a switch device for activating in response to leaking battery electrolyte solution, examples of the water-soluble sealing material 22 include ABS, polyacrylonitrile, polyvinylidene fluoride, saturated polyesters such as PET, PTT, and PEN, among others. In these water-soluble materials as well, because there are cases in which high molecular weights reduce dissolution rates and thus might reduce the reaction time of the switch device 1, when giving priority to reaction rates, it is preferable to adjust the degree of polymerization.

By blocking the guiding inlet 7 or guiding conduit 9 with the water-soluble sealing material 22, in states other than wet states which should activate the switch device 1, small volumes of liquid can be repelled and not allowed to enter the housing 6, thereby preventing improper activation and ensuring reliability as a sensor.

Example Application 1

Figure 28:
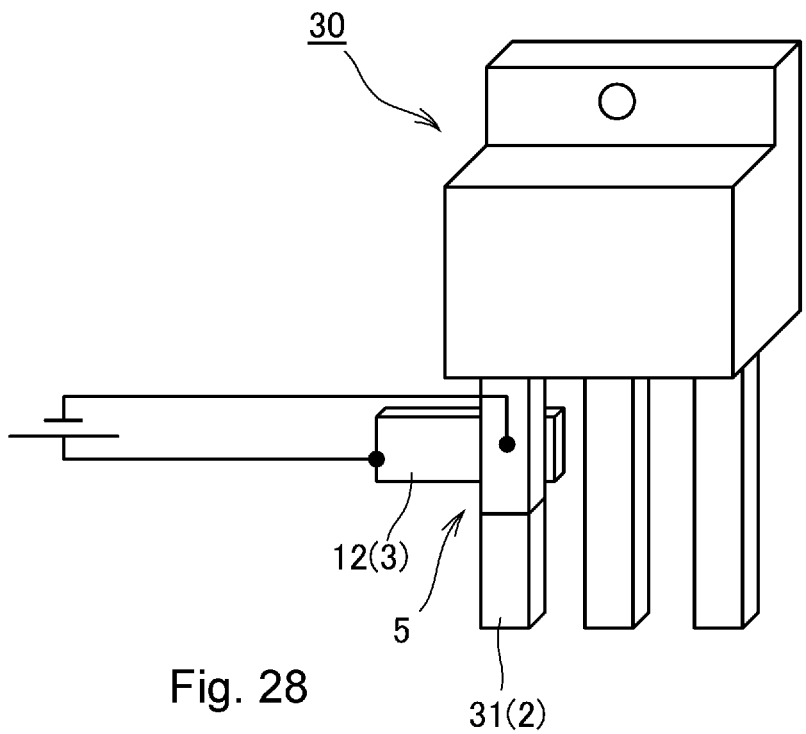
FIG. 28 is a perspective view illustrating an electronic component using a switch device according to the present disclosure.

Next, an example application of the present disclosure will be described. A switch device 1 according to the present disclosure may be incorporated in an electronic component such as an FET. FIG. 28 is a perspective view illustrating an FET 30, which is an electronic component incorporating the switch device 1. In the FET 30, a gate electrode 31 is used as the first conductor 2, and the reaction part 5 is formed by arranging an electrode 12 as the second conductor 3 in a vicinity of the reaction part 5.

In the FET 30, in a normal state before liquid enters, the gate electrode 31 allows current to pass and is connected to connection terminals formed on any kind of circuit board. Then, in the FET 30, when liquid enters the housing 6, the gate electrode 31 is electrically corroded at the reaction part 5, thus interrupting the current. Therefore, the FET 30 can stop switching (deactivate functioning) by wetting with a liquid.

A power source schematically illustrated in FIG. 28 for applying a voltage to the reaction part 5 can be powered from any part of the circuit board to which the FET 30 is connected, and the magnitude of the power supply voltage is preferably set in accordance with the gate voltage characteristics of the FET.

Furthermore, instead of the gate electrode 31, it is also possible to provide a drain electrode or a source electrode with the reaction part 5 in the same manner. In this case, the electrode becomes narrower due to electrical corrosion, thus decreasing current capacity and generating heat from current flowing therethrough; blowing out the electrode with this heating can be expected to achieve blowout more easily.

It should be noted that the switching element 1 may incorporate the FET 30 in the housing 6, and the gate electrode 31 may be blown out by liquid entering the housing 6. Alternatively, a housing of an electronic component such as that of the FET 30 may be used as the housing 6 of the switch device 1, and the guiding inlet 7 may be provided in the housing of this electronic component along with providing the reaction part 5 in the housing interior. Alternatively, the reaction part 5 may be formed outside of the housing of the electronic component by arranging the electrode 12 in the vicinity of the gate electrode 31 of the FET 30.

Example Application 2

Figure 29:
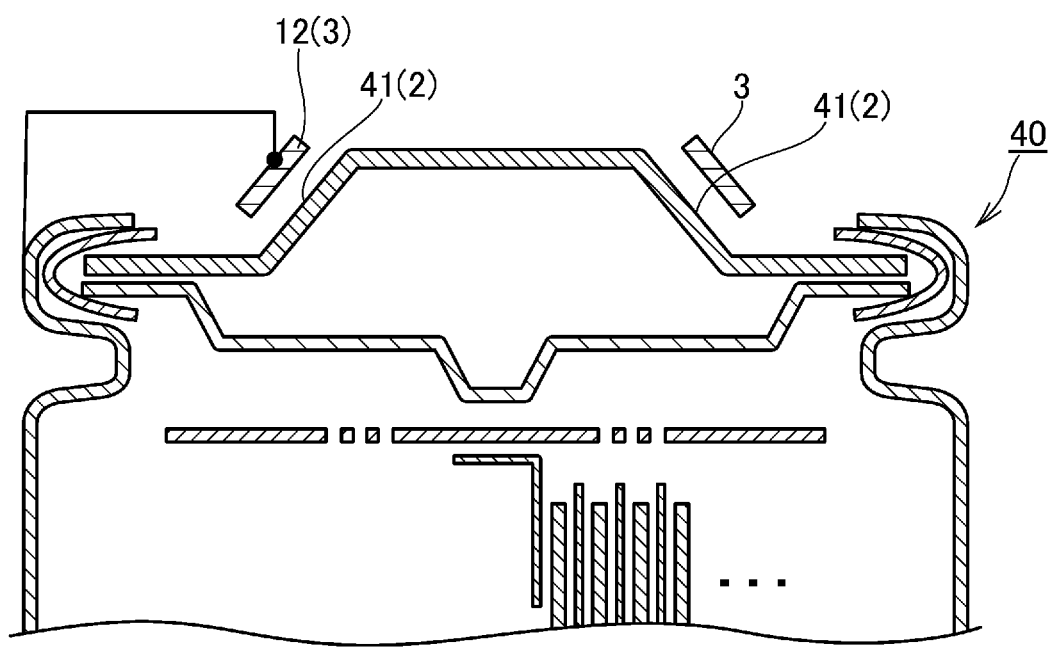
FIG. 29 is a schematic view illustrating a battery system using a switch device according to the present disclosure.

Furthermore, a switch device 1 according to the present disclosure may be incorporated in a battery cell. FIG. 29 is a cross-sectional view of a cylindrical battery cell 40. For example, in the switch device 1, a positive electrode 41 of the battery cell 40 serves as the first conductor 2 through which current is allowed to pass under normal conditions, a battery holder which is not illustrated serves as the housing 6; when the battery cell 40 is installed in the battery holder, a reaction part 5 is formed by the positive electrode 41 being brought close to an electrode 12, serving as the second conductor 3, provided on the battery holder side. The electrode 12 is connected to a negative electrode of the battery cell 40 installed in the battery holder.

The positive electrode 41 of the battery cell 40 allows current to flow under normal conditions, and electrical power is supplied to a circuit of any kind via electrode terminals of the battery holder. Then, when liquid enters the battery holder, such as in wetting with water or liquid leaking from a battery, the positive electrode 41 of the battery cell 40 is electrically corroded at the reaction part 5, thus interrupting the current. Thereby, the switch device 1 can stop current flow of the battery cell 40 when wetted with a liquid.

Figure 30A:
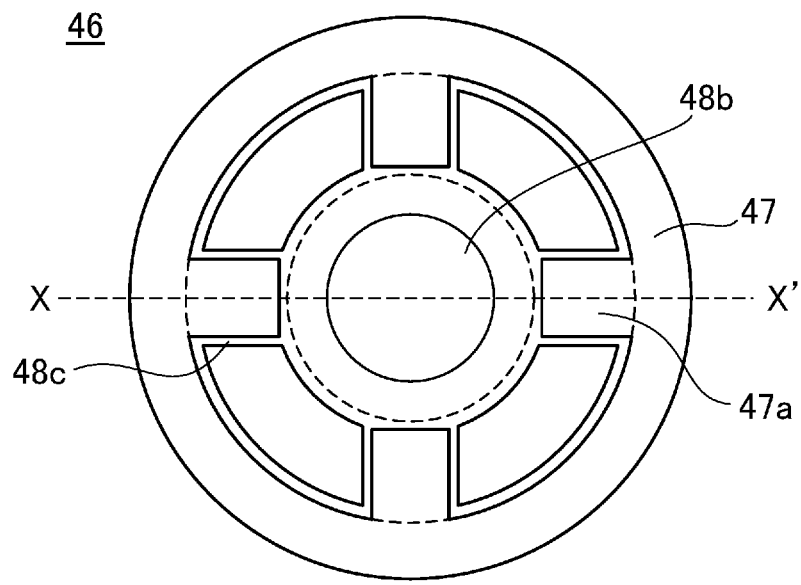
FIG. 30 schematically represents a battery system using a switch device according to the present disclosure in (A) a plan view and (B) a cross-sectional view along X-X' represented in (A).
Figure 30B:
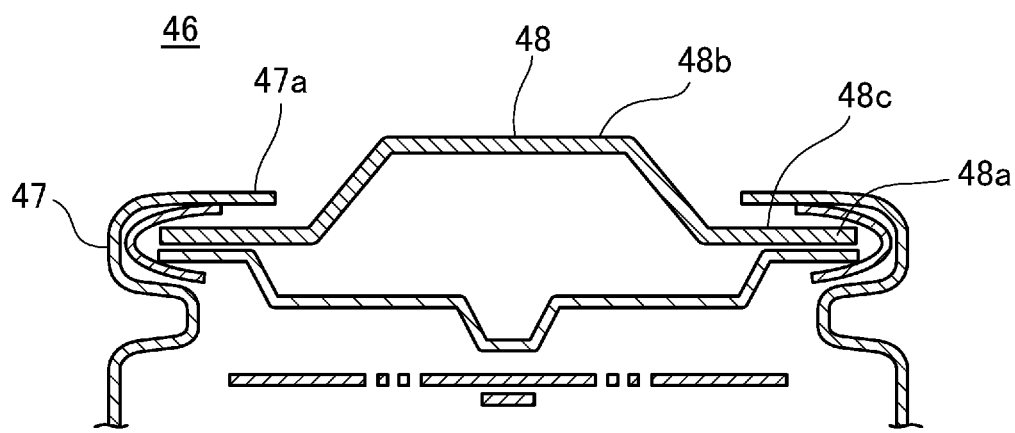

Furthermore, the switch device 1 may be constituted by a single cylindrical battery cell. A cylindrical battery cell 46, as illustrated in FIG. 30, has a round tube-shaped outer can 47 and a top cover 48 connected on one end of the outer can 47 which closes the outer can 47. The top cover 48 is connected by crimping an outer edge 48a to one end of the outer can 47. Moreover, in the top cover 48, an opening is provided between the outer edge 48a and a center portion 48b, which serves as a positive electrode terminal portion, and one or a plurality of connecting portions 48c are provided between the outer edge portion 48a and the center portion 48b.

The connecting portion 48c is overlapped at a predetermined clearance by a conductive projecting portion 47a projecting from the outer can 47 which is a negative electrode. In the battery cell 46, the reaction part 5 is thus formed by the connecting portion 48c, serving as the first conductor 2, and the projecting portion 47a, serving as the second conductor 3, overlapping the connecting portion 48c. It should be noted that the projecting portion 47a may be constituted by a portion of the external can 47 or may be constituted by using a conductor electrically connected to the external can 47.

In the battery cell 46, the center portion 48b serving as the positive electrode terminal portion allows current to flow under normal conditions, and electrical power is supplied to any of a variety of circuits. Then, when a liquid enters between the connecting portion 48c and the projecting portion 47a of the battery cell 46, such as in wetting with water or liquid leaking from a battery, the connecting portion 48c is electrically corroded at the reaction part 5, thus interrupting the current. Thereby, the switch device 1 can stop current flow of the battery cell 46 by wetting with a liquid.

Figure 31:
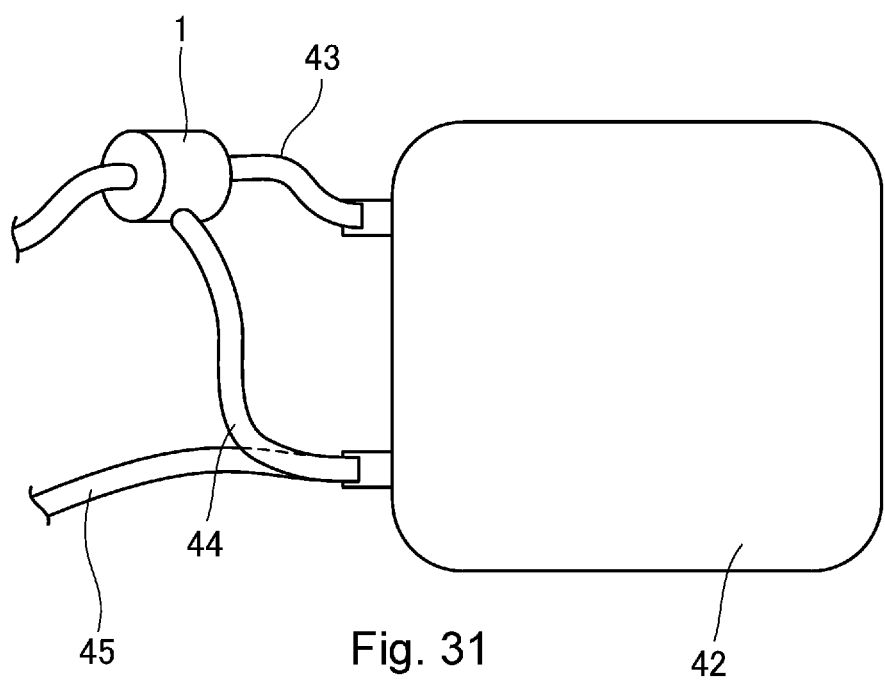
FIG. 31 is a schematic view illustrating a battery system using a switch device according to the present disclosure.

As illustrated in FIG. 31, the switch device 1 may be provided on a charge/discharge path of a laminated battery cell 42. The switch device 1 uses a conductor such as a positive electrode side lead wire 43 constituting a charge/discharge current path of the laminated battery cell 42 or a fuse element 11 connected to the positive electrode side lead wire 43 within the housing 6 as the first conductor 2, which is disposed close to an electrode 12 connected to a first negative electrode side lead wire 44 of the laminated battery cell 42 within the housing 6 to form the reaction part 5.

In the laminated battery cell 42, the positive electrode side lead wire 43 and a second negative electrode side lead wire 45 are connected to a charging device or to an electronic appliance and, under normal conditions, current is allowed to flow via the switch device 1, thus enabling charging/discharging. Then, in the laminated battery cell 42, when liquid enters the housing 6 of the switch device 1 such as when wet with water, the first conductor 2 blows out at the reaction part 5, and current is interrupted in the positive electrode side lead wire 43. Thereby, in the switch device 1, the charge/discharge path of the laminated battery cell 42 can be interrupted by being wet with liquid.

REFERENCE SIGNS LIST

1 switch device, 2 first conductor, 3 second conductor, 5 reaction part, 6 housing, 7 guiding inlet, 8 discharging outlet, 9 guiding conduit, 11 fuse element, 11a first terminal, 11b second terminal, 12 electrode, 12a third terminal, 13 through hole, 14 separator, 15 support, 16 insulating substrate, 17 coating layer, 18 water repellent treatment portion, 19 water-absorbing and heat-generating material, 21 reservoir, 22 water-soluble sealing material, 30 FET, 31 gate electrode, 40 battery cell, 41 positive electrode, 42 laminated battery cell, 43 positive electrode side lead wire, 44 first negative electrode side lead wire, 45 second negative electrode side lead wire, 46 battery cell, 47 outer can, 47a projecting portion, 48 top cover, 48a outer edge portion, 48b center portion, 48c connecting portion

The invention claimed is:

1. A switch device comprising:
   a first conductor connected to an external circuit and having a relatively high ionization tendency; and
   a second conductor arranged close to the first conductor in a distance between 0.01 mm to 10 mm, the second conductor having a relatively low ionization tendency which is lower than that of the first conductor, wherein a reaction part which electrically corrodes the first conductor is formed by a liquid between the first and second conductors.

2. The switch device according to claim 1, wherein a through hole is provided in at least one of the first and second conductors in the reaction part.

3. The switch device according to claim 1, wherein a concave/convex surface is provided on at least one of the first and second conductors in the reaction part.

4. The switch device according to claim 1, wherein a gap between the first and second conductors in a region in a vicinity of the reaction part is relatively narrower in comparison to that in other regions.

5. The switch device according to claim 1,
   wherein the first and second conductors each have a faceable surface, and
   wherein the switch device has a laminated structure having a plurality of alternating layers.

6. The switch device according to claim 1,
   wherein the first and second conductors each have a faceable flat surface,
   wherein a number of the second conductor is larger than a number of the first conductor by one, and
   wherein the switch device has a laminated structure in which the second conductor is arranged to face both sides of the first conductor.

7. The switch device according to claim 1, wherein the reaction part includes a separator between the first and second conductors.

8. The switch device according to claim 7, wherein the separator has a liquid-collecting property.

9. The switch device according to claim 7, wherein the separator has a solubility property.

10. The switch device according to claim 7, wherein the separator carries an electrolyte.

11. The switch device according to claim 7, wherein the separator has an insulating property.

12. The switch device according to claim 1,
    wherein the first conductor having a relatively high ionization tendency is connected as a positive electrode, and
    wherein the second conductor having a relatively low ionization tendency is connected as a negative electrode.

13. The switch device according to claim 1,
    wherein the first conductor having a relatively high ionization tendency has a primary constituent selected from the group consisting of aluminum, iron, nickel, tin, and lead, and
    wherein the second conductor which has a relatively low ionization tendency has a primary constituent selected from the group consisting of gold, platinum, silver, copper, and palladium.

14. The switch device according to claim 1, wherein a plurality of surfaces of the first conductor and/or the second conductor are facing in the reaction part.

15. The switch device according to claim 1, wherein at least one of the first and second conductors is coated on a surface with the liquid-soluble material which is to be dissolved by a liquid in the reaction part.

16. The switch device according to claim 1, wherein a water repellent region is provided in a location other than the reaction part, or in a location other than the reaction part and a vicinity of the reaction part.

17. The switch device according to claim 1, wherein a water-absorbing and heat-generating material is arranged in a vicinity of the reaction part.

18. The switch device according to claim 1, wherein a reservoir which accumulates the liquid is provided at a position at which the reaction part is provided.

19. The switch device according to claim 1, further comprising
    a housing in which the first and second conductors and the reaction part are provided,
    wherein a guiding inlet for guiding the liquid into the housing is provided in the housing.

20. The switch device according to claim 19, wherein the housing is polyhedral and has a plurality of surfaces, one or a plurality of surfaces being provided with one or a plurality of the guiding inlet.

21. The switch device according to claim 19, wherein the housing is formed in a tube shape having a side surface, the side surface being provided with one or more of the guiding inlet.

22. The switch device according to claim 19, wherein the housing is provided with a discharging outlet for discharging the entering liquid.

23. The switch device according to claim 22, wherein the discharging outlet is provided at the same height as the reaction part or is provided at a position higher than the reaction part.

24. The switch device according to claim 19, wherein the guiding inlet is provided with a guiding conduit for guiding the liquid to the reaction part.

25. The switch device according to claim 24, wherein the guiding conduit progressively narrows from an opening of the guiding inlet towards an interior.

26. The switch device according to claim 19, wherein the housing is subjected to a water repellent treatment in the guiding inlet.

27. The switch device according to claim 24, wherein the housing is subjected to a water repellent treatment in the guiding conduit.

28. The switch device according to claim 19, wherein the housing is subjected to a water repellent treatment on an inner wall.

29. The switch device according to claim 19, wherein the guiding inlet is blocked by a water-soluble material which is to be dissolved by the liquid.

30. The switch device according to claim 24, wherein a water-soluble material which is to be dissolved by the liquid is provided in the guiding conduit.

31. An electronic component comprising:
   an external-connection terminal connected to an external circuit; and
   a conductor arranged close to the external-connection terminal in a distance between 0.01 mm to 10 mm, the conductor having a relatively low ionization tendency which is lower than that of the external-connection terminal,
   wherein a reaction part which electrically corrodes the external-connection terminal is formed by a liquid retained between the external-connection terminal and the conductor.

32. A battery system comprising:
   a battery; and
   a conductor arranged close to a terminal of the battery in a distance between 0.01 mm to 10 mm, the conductor having a relatively low ionization tendency which is lower than that of the terminal,
   wherein a reaction part which electrically corrodes the terminal is formed by a liquid retained between the terminal and the conductor.

33. The switch device according to claim 1, wherein the distance between the first conductor and the second conductor is between 0.01 mm to 1 mm.

* * * * *